US007649524B2

(12) United States Patent
Haim et al.

(10) Patent No.: US 7,649,524 B2
(45) Date of Patent: Jan. 19, 2010

(54) TRACKING WINDOW FOR A DIGITIZER SYSTEM

(75) Inventors: Alon Haim, RaAnana (IL); Ori Rimon, Tel-Aviv (IL)

(73) Assignee: N-trig Ltd., Kfar-Saba (IL)

( * ) Notice: Subject to any disclaimer, the term of this patent is extended or adjusted under 35 U.S.C. 154(b) by 494 days.

(21) Appl. No.: 11/180,711

(22) Filed: Jul. 14, 2005

(65) Prior Publication Data
US 2006/0012581 A1  Jan. 19, 2006

Related U.S. Application Data

(60) Provisional application No. 60/587,664, filed on Jul. 15, 2004.

(51) Int. Cl.
G06F 3/41 (2006.01)
(52) U.S. Cl. ........................ 345/173; 345/178
(58) Field of Classification Search ......... 345/156–160, 345/163, 182–184, 168–173, 164, 177–179; 704/243; 700/86; 178/18.03–18.06, 19.03, 178/19.04; 348/36; 340/425.5
See application file for complete search history.

(56) References Cited

U.S. PATENT DOCUMENTS

| 3,944,740 A | 3/1976 | Murase et al. |
| 4,293,734 A | 10/1981 | Pepper, Jr. |
| 4,331,333 A | 5/1982 | Willcocks |
| 4,398,720 A | 8/1983 | Jones et al. |
| 4,446,491 A | 5/1984 | Tidd et al. |
| 4,550,221 A | 10/1985 | Mabusth |
| 4,639,720 A | 1/1987 | Rympalski et al. |
| 4,686,332 A | 8/1987 | Greanias et al. |
| 4,878,553 A | 11/1989 | Yamanami et al. |
| 4,988,837 A | 1/1991 | Murakami et al. |
| 5,129,654 A | 7/1992 | Bogner |
| 5,190,285 A | 3/1993 | Levy et al. |
| 5,231,381 A | 7/1993 | Duwaer |
| 5,252,951 A * | 10/1993 | Tannenbaum et al. ....... 345/156 |
| 5,365,461 A | 11/1994 | Stein et al. |
| 5,402,151 A | 3/1995 | Duwaer |
| 5,510,813 A | 4/1996 | Makinwa et al. |
| 5,543,589 A | 8/1996 | Buchana et al. |

(Continued)

FOREIGN PATENT DOCUMENTS

EP  0694865  1/1996

(Continued)

OTHER PUBLICATIONS

Rekimoto et al. "Augmented Surfaces: A Spatially Continuous Work Space for Hybrid Computing Environments", Proc. of Conference on Human Factors in Computing Systems, CHI 99, p. 378-385, 1999.

*Primary Examiner*—Prabodh M Dharia

(57) ABSTRACT

A digitizer apparatus for digitizing user interactions, for example detecting locations of physical objects, comprises: sensing elements, spread across a sensing area, configured for sensing the user interactions, say involving a stylus or like object, and a controller, associated with the sensing elements, configured to dynamically select a tracking window for the interaction, the tracking window comprising a subset of the sensing elements which are activated for sensing the object. The window is selected to center on the interaction based on e.g. last known location data, and thereby save processing resources by sampling only the minimum number of sensing elements necessary at any time.

59 Claims, 18 Drawing Sheets

U.S. PATENT DOCUMENTS

| | | | |
|---|---|---|---|
| 5,565,632 | A | 10/1996 | Ogawa |
| 5,571,997 | A | 11/1996 | Gray et al. |
| 5,670,755 | A | 9/1997 | Kwon |
| 5,777,607 | A | 7/1998 | Koolen |
| 5,790,160 | A | 8/1998 | Reeves et al. |
| 5,841,078 | A | 11/1998 | Miller et al. |
| 5,853,327 | A | 12/1998 | Gilboa |
| 5,889,236 | A * | 3/1999 | Gillespie et al. .......... 178/18.01 |
| 5,956,020 | A | 9/1999 | D'Amico et al. |
| 5,959,617 | A * | 9/1999 | Bird et al. .................... 345/182 |
| 6,037,882 | A | 3/2000 | Levy |
| 6,128,007 | A | 10/2000 | Seybold et al. |
| 6,232,956 | B1 * | 5/2001 | Mailman .................... 345/156 |
| 6,239,389 | B1 | 5/2001 | Allen et al. |
| 6,278,443 | B1 | 8/2001 | Amro et al. |
| 6,392,636 | B1 | 5/2002 | Ferrari et al. |
| 6,417,846 | B1 | 7/2002 | Lee |
| 6,424,338 | B1 * | 7/2002 | Anderson ................... 345/173 |
| 6,433,069 | B1 | 8/2002 | Oeltjen et al. |
| 6,452,514 | B1 | 9/2002 | Philipp |
| 6,473,069 | B1 | 10/2002 | Gerpheide |
| 6,504,530 | B1 | 1/2003 | Wilson et al. |
| 6,505,745 | B1 | 1/2003 | Anderson |
| 6,507,093 | B2 | 1/2003 | Kaneda et al. |
| 6,570,557 | B1 | 5/2003 | Westerman et al. |
| 6,583,676 | B2 | 6/2003 | Krah et al. |
| 6,587,093 | B1 | 7/2003 | Shaw et al. |
| 6,611,258 | B1 | 8/2003 | Tanaka et al. |
| 6,618,039 | B1 * | 9/2003 | Grant et al. .................. 345/168 |
| 6,633,280 | B1 | 10/2003 | Matsumoto et al. |
| 6,650,319 | B1 | 11/2003 | Hurst et al. |
| 6,690,156 | B1 | 2/2004 | Weiner et al. |
| 6,762,752 | B2 | 7/2004 | Perski et al. |
| 6,781,575 | B1 | 8/2004 | Hawkins et al. |
| 6,850,252 | B1 | 2/2005 | Hoffberg |
| 6,885,317 | B1 | 4/2005 | Gutowitz |
| 7,009,594 | B2 * | 3/2006 | Wang et al. ................. 345/156 |
| 7,046,230 | B2 * | 5/2006 | Zadesky et al. ............ 345/156 |
| 7,106,313 | B2 * | 9/2006 | Schena et al. ............... 345/184 |
| 7,133,031 | B2 * | 11/2006 | Wang et al. ................. 345/173 |
| 7,218,313 | B2 * | 5/2007 | Marcus et al. .............. 345/169 |
| 7,372,455 | B2 * | 5/2008 | Perski et al. ................. 345/173 |
| 2002/0015064 | A1 | 2/2002 | Robotham et al. |
| 2002/0196250 | A1 * | 12/2002 | Anderson et al. ........... 345/420 |
| 2003/0079921 | A1 | 5/2003 | Yeh |
| 2003/0098858 | A1 | 5/2003 | Perski et al. |
| 2003/0122795 | A1 | 7/2003 | Fujitsuka et al. |
| 2003/0214684 | A1 | 11/2003 | Kuboki |
| 2004/0012567 | A1 | 1/2004 | Ashton |
| 2004/0017355 | A1 * | 1/2004 | Shim ........................... 345/157 |
| 2004/0061678 | A1 * | 4/2004 | Goh et al. .................... 345/156 |
| 2004/0090424 | A1 | 5/2004 | Hurley et al. |
| 2004/0095333 | A1 | 5/2004 | Morag et al. |
| 2004/0105040 | A1 | 6/2004 | Oh et al. |
| 2004/0114934 | A1 | 6/2004 | Taxis |
| 2004/0125077 | A1 | 7/2004 | Ashton |
| 2004/0140965 | A1 * | 7/2004 | Wang et al. ................. 345/179 |
| 2004/0145457 | A1 * | 7/2004 | Schofield et al. ......... 340/425.5 |
| 2004/0155871 | A1 | 8/2004 | Perski et al. |
| 2004/0164970 | A1 * | 8/2004 | Benard et al. ............... 345/177 |
| 2004/0178995 | A1 * | 9/2004 | Sterling ....................... 345/173 |
| 2004/0193413 | A1 * | 9/2004 | Wilson et al. ............... 704/243 |
| 2004/0233174 | A1 * | 11/2004 | Robrecht et al. ............ 345/173 |
| 2005/0093846 | A1 * | 5/2005 | Marcus et al. .............. 345/184 |
| 2005/0174333 | A1 | 8/2005 | Robinson et al. |
| 2005/0237297 | A1 * | 10/2005 | Holloway et al. ........... 345/157 |
| 2006/0029296 | A1 * | 2/2006 | King et al. ................... 382/313 |
| 2006/0052169 | A1 * | 3/2006 | Britt et al. ...................... 463/42 |
| 2006/0109263 | A1 * | 5/2006 | Wang et al. ................. 345/179 |
| 2006/0155398 | A1 * | 7/2006 | Hoffberg et al. .............. 700/86 |
| 2006/0161858 | A1 | 7/2006 | Hawkins et al. |
| 2007/0018970 | A1 * | 1/2007 | Tabasso et al. .............. 345/184 |
| 2007/0106950 | A1 | 5/2007 | Hutchinson et al. |
| 2007/0182812 | A1 * | 8/2007 | Ritchey ......................... 348/36 |
| 2007/0211035 | A1 * | 9/2007 | Marcus et al. .............. 345/169 |

FOREIGN PATENT DOCUMENTS

| | | |
|---|---|---|
| EP | 0718750 | 6/1996 |
| EP | 0727756 | 8/1996 |
| EP | 0737933 | 10/1996 |
| EP | 1331547 | 7/2003 |
| WO | WO 98/58237 | 12/1998 |
| WO | WO 02/10791 | 2/2002 |
| WO | WO 03/046882 | 5/2003 |
| WO | WO 2004/070396 | 8/2004 |
| WO | WO 2005/020057 | 3/2005 |
| WO | WO 2006/006173 | 1/2006 |
| WO | WO 2006/006174 | 1/2006 |

* cited by examiner

TRACKING WINDOW FOR A DIGITIZER SYSTEM

RELATED APPLICATIONS

The present application claims the benefit of U.S. Provisional Application No. 60/587,664, filed on Jul. 15, 2004, the contents of which are hereby incorporated by reference.

FIELD AND BACKGROUND OF THE INVENTION

The present invention relates to a digitizer system and, more particularly, but not exclusively to a tracking window for a digitizer system.

A digitizer is a computer associated input device capable of tracking user interactions. In most cases the digitizer is associated with a display screen to enable touch or stylus detection.

U.S. Pat. No. 6,690,156, entitled "Physical Object Location Apparatus And Method And A Platform Using The Same", assigned to N-trig Ltd., and U.S. patent application Ser. No. 10/649,708, entitled "Transparent Digitizer", filed for N-trig Ltd., describe a positioning device capable of detecting multiple physical objects, preferably styluses, located on top of a flat screen display. One of the preferred embodiments in both of these documents describes a system built of transparent foils containing a matrix of vertical and horizontal conductors. The stylus is an electromagnetic stylus, which is triggered by an excitation coil that surrounds the foils.

The exact position of the stylus is determined by processing the signals that are sensed by the matrix of horizontal and vertical conductors.

Other known digitizer systems include various physical objects responsive to an electromagnetic signal, such as gaming pieces. For example, gaming tokens comprising a resonant circuit, as described in U.S. Pat. No. 6,690,156, entitled "physical object location apparatus and method and a graphic display device, using the same", assigned to N-trig Ltd.

U.S. Pat. No. 4,878,553, entitled "Position detecting apparatus", assigned to Wacom Inc., describes a system comprising a set of conductive loops arranged in rows and columns. The loops are excited periodically, one at a time, in order to sense the presence of an electromagnetic stylus at the surface of the device. In order to detect the stylus presence in the Y direction, each loop on the X axis is excited sequentially in the stylus resonance frequency. Then the digitizer samples all the loops on the Y axis to determine the stylus location. The process is similar for determining the stylus location on the X direction.

U.S. patent application Ser. No. 10/757,489, entitled "Touch detection for a digitizer", assigned to N-trig Ltd., describes three methods of touch detection using a matrix of conductive antennas. In one embodiment, touch detection is performed by providing periodic excitation of the antennas on one axis using an AC signal, while the antennas on the perpendicular axis are sampled. When a conductive object, such as the user finger, touches the surface of the device a phenomena called trans-conductance occurs. The touch serves as a conductor coupling two adjacent lines transferring the oscillating signal from one conductor to the other.

One of the major drawbacks in the above digitizers is that larger sensing areas require a greater number of antennas\conductive loops in order to maintain the same level of resolution and performance. The fact that the antennas\conductive loops are excited one at a time prolongs the required detection time, thus limiting the update rate and digitizer performance and increasing the cost of the digitizer.

The amount of time taken for calculating the object location linearly increases with the amount of antennas\conductive loops\sensing elements constructing the sensor.

Reference is now made to FIG. 1 which illustrates a prior art position detecting apparatus, described in U.S. Pat. No. 4,878,553, referenced above. Sensor 100 comprises a set of conductive loops arranged in rows 102 and columns 103. The loops are excited periodically, one at a time, in order to sense the presence of an electromagnetic stylus 104 at the surface of the device. In order to detect the stylus presence in the Y direction, each loop on the X axis 102 is excited sequentially in the stylus resonance frequency. Then the digitizer samples all the loops on the Y axis 103 to determine the stylus location. The process is similar for determining the stylus location on the X direction. For example, when the stylus is within the range of an excited loop 105, it is charged with electromagnetic energy. The resonating stylus induces an electrical signal 106 on the perpendicular loop 107.

Consider a sensor of an area A1, comprising X1 conductive loops on the X axis 102, and Y1 conductive loops on the Y axis 103. In this case the stylus location is determined by (X1+Y1) steps. The larger the sensor area, the more conductive loops are required in order to detect the stylus without compromising the resolution level of the sensor.

As demonstrated in the above example, an increase in the number of conductive elements leads to a linear increase in detection time. The increased detection time reduces the digitizer update rate, thus limiting its performance. Furthermore, the large amount of sampling leads to an increase in the need for electronic components and computation power. These are typical problems in all digitizer systems relying on periodic excitation and/or sampling in order to detect a physical object.

A method of touch detection using a matrix of conductive antennas is described in U.S. patent application Ser. No. 10/757,489, referenced above. In order to determine the touch position the antennas are continuously excited using an AC signal. In the presence of touch the sampled electrical signal is attenuated. This detection technique involves only one sampling and excitation step per axis. However, a large amount of processing is required because all the antennas are taken into account.

There is thus a widely recognized need for, and it would be highly advantageous to have, a digitizer system devoid of the above limitations.

SUMMARY OF THE INVENTION

According to one aspect of the present invention there is provided an apparatus for detecting locations of physical objects, comprising: a plurality of sensing elements, spread across a sensing area, configured for sensing at least one physical object, and a controller, associated with the sensing elements, configured to dynamically select a tracking window for the at least one physical object, the tracking window comprising a subset of the sensing elements, for tracking the object, to determine a location for the respective object.

The controller is arranged to dynamically reconfigure the subset comprising the tracking window for the object, according to at least one of a group of parameters comprising: previous location of the object, speed of the object, acceleration of the object, direction of progress of the object, and an analysis of history of the object.

The window may have a fixed size and may comprise a number of sensing elements. Alternatively, the window may have a dynamically adjustable size.

According to a second aspect of the present invention there is provided a method for detecting locations of physical objects, comprising: searching for at least one physical object utilizing a plurality of sensing elements, spread across a sensing area, by analyzing a wide range of frequencies on the plurality of sensing elements, for detecting approximate location and frequency for each respective one of the at least one physical object, finding a frequency for the object, locating a location of the object, selecting a tracking window for the object, the tracking window comprising a portion of the plurality of sensing elements, spread around the location, and tracking each respective object, by analyzing the signals at said found frequency for the respective object, on the tracking window, and by dynamically updating the tracking window to keep track of the object as it moves.

According to a third aspect of the present invention there is provided a system for sampling a sensing area having a plurality of sensing elements, comprising: a plurality of amplifiers, for amplifying signals detected by the sensing elements and a multiplexer (MUX) associated with the amplifiers for inputting signals, the signal originating from a selected portion of the sensing elements.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
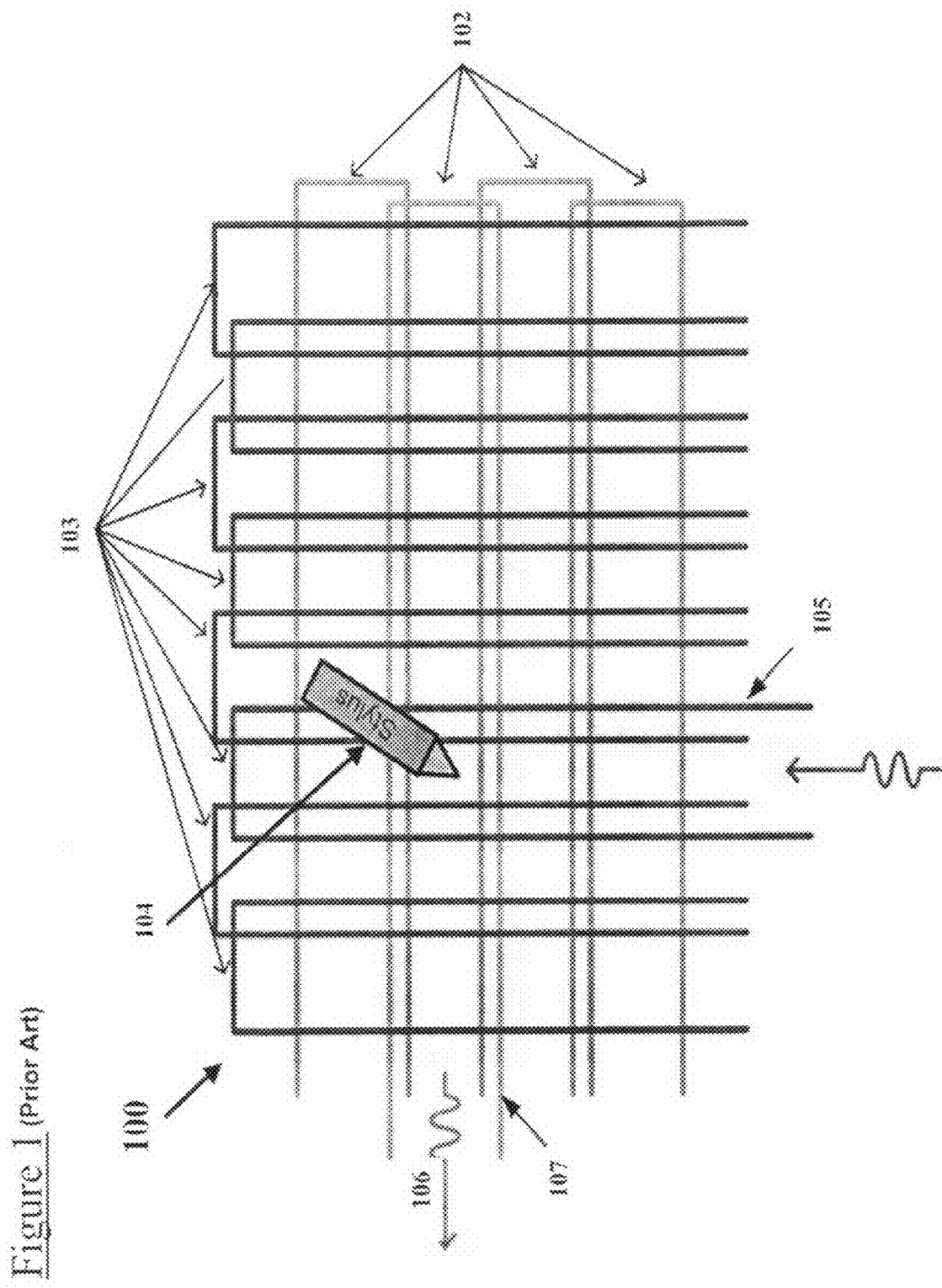
FIG. 1 illustrates a prior art position detecting apparatus.

The present embodiments comprise an apparatus and a method for implementing a tracking window for detecting location and movement of physical objects.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

A digitizer apparatus for digitizing user interactions, for example detecting locations of physical objects, preferably comprises: sensing elements, spread across a sensing area, configured for sensing the user interaction, say involving a stylus or like object, and a controller, associated with the sensing elements, configured to dynamically select a tracking window for the interaction, the tracking window comprising a subset of the sensing elements which are activated for sensing the object. The window is selected to center on the interaction based on e.g. last known location data, and thereby save processing resources by sampling only the minimum number of sensing elements necessary at any time.

Figure 2A:
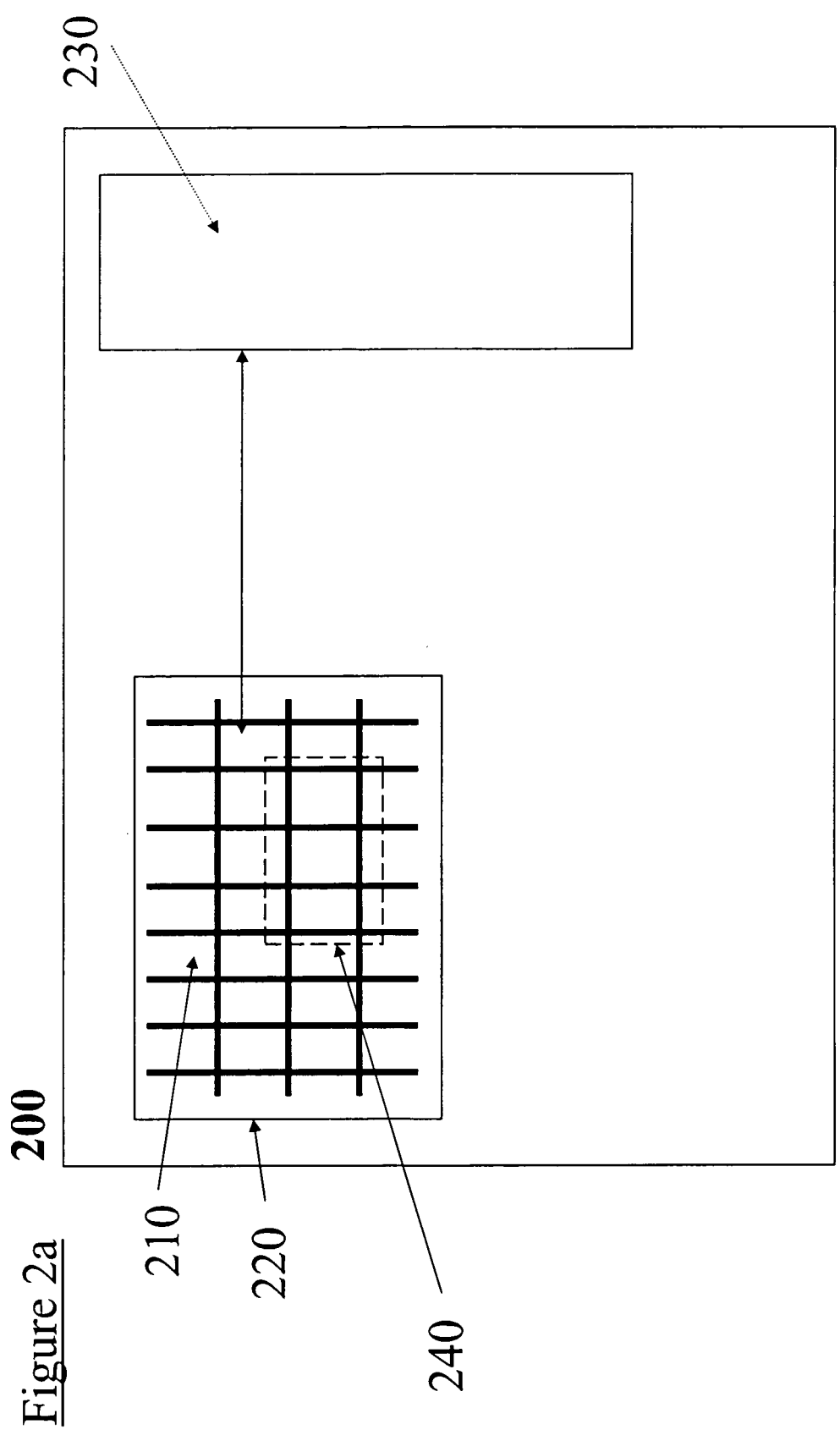
FIG. 2a is a first block diagram of an exemplary apparatus for detecting locations of physical objects according to a preferred embodiment of the present invention.

Reference is now made to FIG. 2a, which is a first block diagram of an exemplary apparatus for detecting locations of physical objects, according to a preferred embodiment of the present invention.

The exemplary apparatus 200 includes conductive sensing elements 210 that are spread across a sensing area 220. For example, these sensing elements 210 may comprise a set of conductive antennas, configured for sensing user interactions, preferably delivered via one or more physical objects that are present at the sensing area 220 or in proximity to the sensing area 220, such as an electromagnetic stylus or a finger.

The exemplary apparatus 200 further includes a controller 230, connected with the sensing elements 210. The controller 230 is configured to dynamically select a tracking window 240. The tracking window 240 comprises a portion of the sensing elements, spread around the location of the physical object. The sensing elements in the tracking window 240 are dynamically selected by the controller 230, around the known location of the physical object, and according to the speed, acceleration, direction of progress, and recent behavior of the physical object. As the object moves, the tracking window is updated by reselecting the sensing elements in the window.

The physical object location is calculated and kept track of, using signals received on those sensing elements within the tracking window 210. Utilizing only a portion of the sensing elements 210 may reduce the dependency of the update rate and resolution on the size of apparatus, and more specifically, on the sensing area 220.

In a preferred embodiment the present invention, the apparatus 200 is a transparent digitizer for a mobile computing device that uses a flat panel display (FPD) screen. The mobile computing device can be any device that enables interactions between the user and the device. Examples of such devices are Tablet PCs, pen enabled lap-top computers, personal digital assists (PDAs) or any hand held devices such as palm pilots, mobile phones etc.

The digitizer detects the position of a physical object at a very high resolution and update rate. The physical object can be either a stylus or any conductive object touching the screen. The physical object may be used for pointing, painting, writing (hand write recognition) and any other activity that is typical for user interaction with the device. The system can detect single or multiple finger touches. Furthermore, the touch detection may be implemented simultaneously with stylus detection.

In a preferred embodiment of the present invention, the physical object in use is a stylus and the digitizer supports full mouse emulation. As long as the stylus hovers above the FPD, a mouse cursor follows the stylus position. Touching the screen stands for left click and a special switch located on the stylus emulates right click operation.

A preferred embodiment of the present invention may utilize a passive stylus that includes a resonance circuit. External excitation coils that surround the sensor excite the resonant circuit within the stylus.

Another preferred embodiment of the present invention utilizes a passive electromagnetic stylus comprising an energy pick-up circuit combined with an oscillator. An example of such an electromagnetic stylus is described in U.S. Provisional Application No. 60/631,862, entitled "Electromagnetic stylus for a digitizer system" (assigned to N-trig Ltd.). However, other embodiments may use an active stylus, battery operated or wire connected, which does not require external excitation circuitry or any other object responsive to excitation by the digitizer.

In some embodiments of the present invention, the electromagnetic object responding to the excitation is a stylus. However, other embodiments may include other physical objects, such as gaming pieces.

Embodiment describing gaming tokens comprising a resonant circuit is described in U.S. Pat. No. 6,690,156 ("physical object location apparatus and method and a platform using the same").

In a preferred embodiment of the present invention, the digitizer detects simultaneous and separate inputs from an electromagnetic stylus and a user finger. Hence, it is capable of functioning as a touch detector as well as detecting a stylus. However, other embodiments may include a digitizer capable of detecting only an electromagnetic stylus or only finger touches.

A preferred embodiment of the present invention utilizes the capacitive coupling between adjacent antennas to determine touch location. Suitable touch detection methods are described in U.S. patent application Ser. No. 10/757,489 (assigned to N-trig), the contents of which are hereby incorporated by reference.

In a preferred embodiment, the stylus supports full mouse emulation. However, in different embodiments the stylus may support additional functionality such as an Eraser, change of color, etc. In some preferred embodiments the stylus may be pressure sensitive and change its frequency or other signal characteristics in response to user pressure.

In a preferred embodiment, the mobile device is an independent computer system having its own CPU. In different embodiments the mobile device may be only a part of a system such as a wireless mobile screen for a personal computer.

In a preferred embodiment, the digitizer is integrated into the host device on top of the FPD screen. In additional embodiments the transparent digitizer can be provided as an accessory that could be placed on top of a screen. Such a configuration can be very useful for laptop computers, which are already in the market in very large numbers. As an accessory, the digitizer may turn a laptop into a powerful device that supports hand writing, painting, or any other operation enabled by the transparent digitizer.

In a preferred embodiment, the digitizer supports one stylus. However, in different embodiments the digitizer may support more than one stylus operating simultaneously on the same screen. Such a configuration is very useful for entertainment application where few users can paint or write to the same paper-like screen.

In a preferred embodiment, the digitizer is implemented on a set of transparent foils. However, in other embodiments the digitizer is implemented using non-transparent sensing elements.

One example for a non-transparent digitizer is a Write Pad device, which is a thin digitizer that is placed below normal paper. In this example, the stylus combines real ink with electromagnetic functionality. The user writes on the normal paper and the input is simultaneously transferred to a host computer to store or analyze the data.

Another embodiment of the present invention, utilizing non-transparent sensing elements, is an electronic entertainment board. The digitizer, in this example, is mounted below the graphic image of the board, and detects the position and identity of gaming figures that are placed on top the board. The graphic image in this case is static, but it could be manually replaced from time to time (such as when switching to a different game).

In other embodiments of the present invention non-transparent sensing elements are integrated in the back of a FPD screen. One example for such an embodiment is an electronic entertainment device with a FPD screen. The device may be used for gaming, in which the digitizer detects the position and identity of gaming figures. It may also be used for painting and/or writing in which the digitizer detects one ore more styluses. In most cases, a configuration of non-transparent sensor with a FPD is used when high performance is not critical for the application.

Figure 2B:
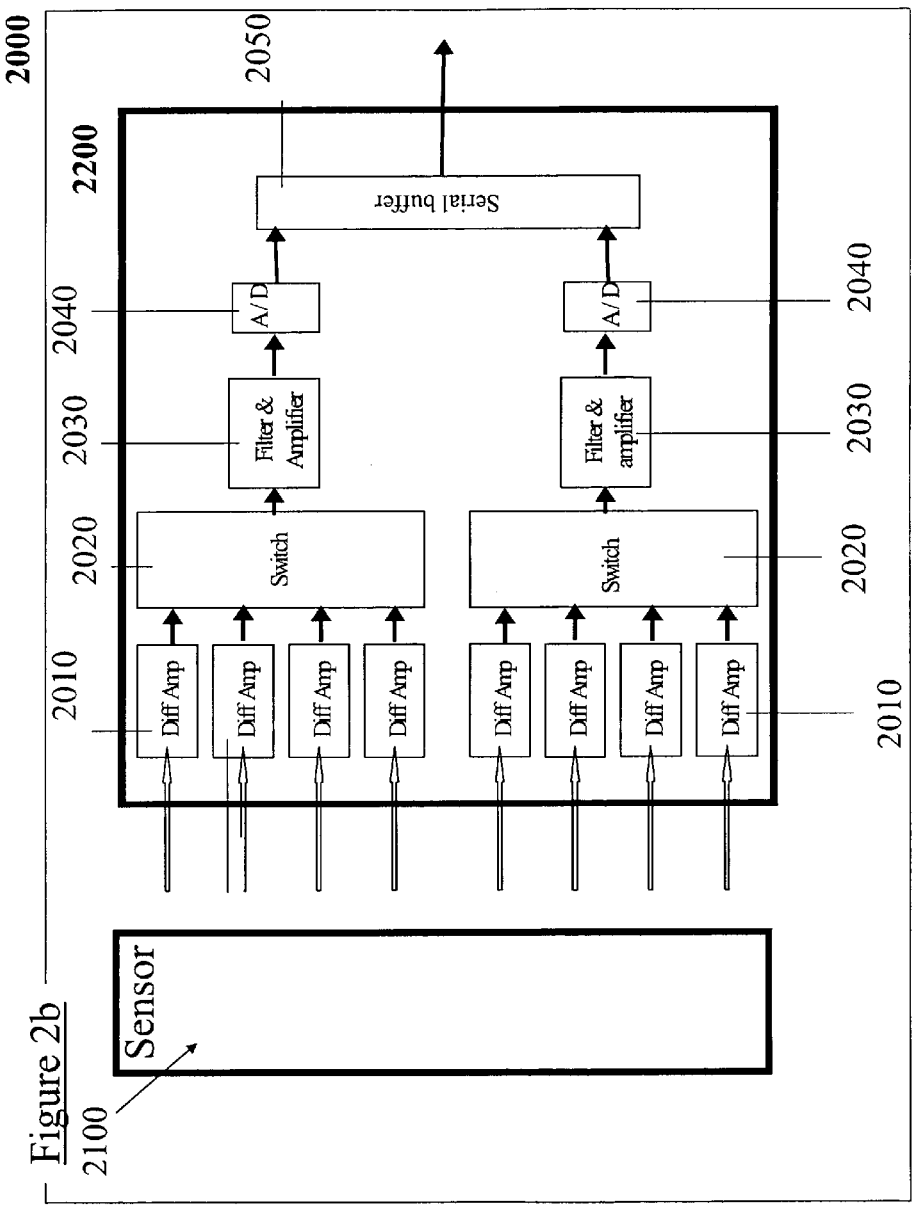
FIG. 2b is a second block diagram of an exemplary apparatus for detecting location of physical objects according to a preferred embodiment of the present invention.

Reference is now made to FIG. 2b which is a second block diagram of an exemplary apparatus for detecting location of physical objects according to a preferred embodiment of the present invention.

Apparatus 2000 is a transparent digitizer, comprising a sensor 2100, having a grid of sensing elements, comprising conductive antennas made of conductive materials patterned on a transparent foil. Further information is provided in U.S. patent application Ser. No. 10/649,708 ("Transparent digitizer"), which is hereby incorporated by reference, under the heading: "Sensor".

The apparatus 2000 further comprises front end units 2200. A front end unit 2200 may comprise differential amplifiers 2010. Each differential amplifier 2010 is preferably connected via each of its differential inputs to one of the sensor's conductive antennas. Two antennas that are connected to a single differential amplifier are preferably not adjacent ones.

The differential amplifiers 2010 are connected in groups to a signal selecting switch 2020, which is connected to a filter & amplifier 2030. The filter & amplifier 2030 is connected to an analog-to-digital converter (A2D) 2040 which is connected to a digital unit (shown in FIG. 2c) via a serial buffer 2050. Further information is provided in U.S. patent application Ser. No. 10/649,708 ("Transparent digitizer"), under the heading: "Front end".

In a preferred embodiment of the present invention, the front end units 2200 are the first stage where sensor signals are processed. Each differential amplifier 2010 receives signals from a different pair of non-adjacent sensing elements, and passes on signals to the switch 2020. Each switch 2020 is fed by a group of amplifiers 2010 and passes on signals from one of the connected amplifiers 2010 to the next stage.

In the next stage, the selected signal is filtered and amplified by a filter & amplifier 2030 prior to sampling. Finally, the signal is sampled by an analog-to-digital converter (A2D) 2040 and sent to a digital unit (described in FIG. 2c) via a serial buffer 2050.

Figure 2C:
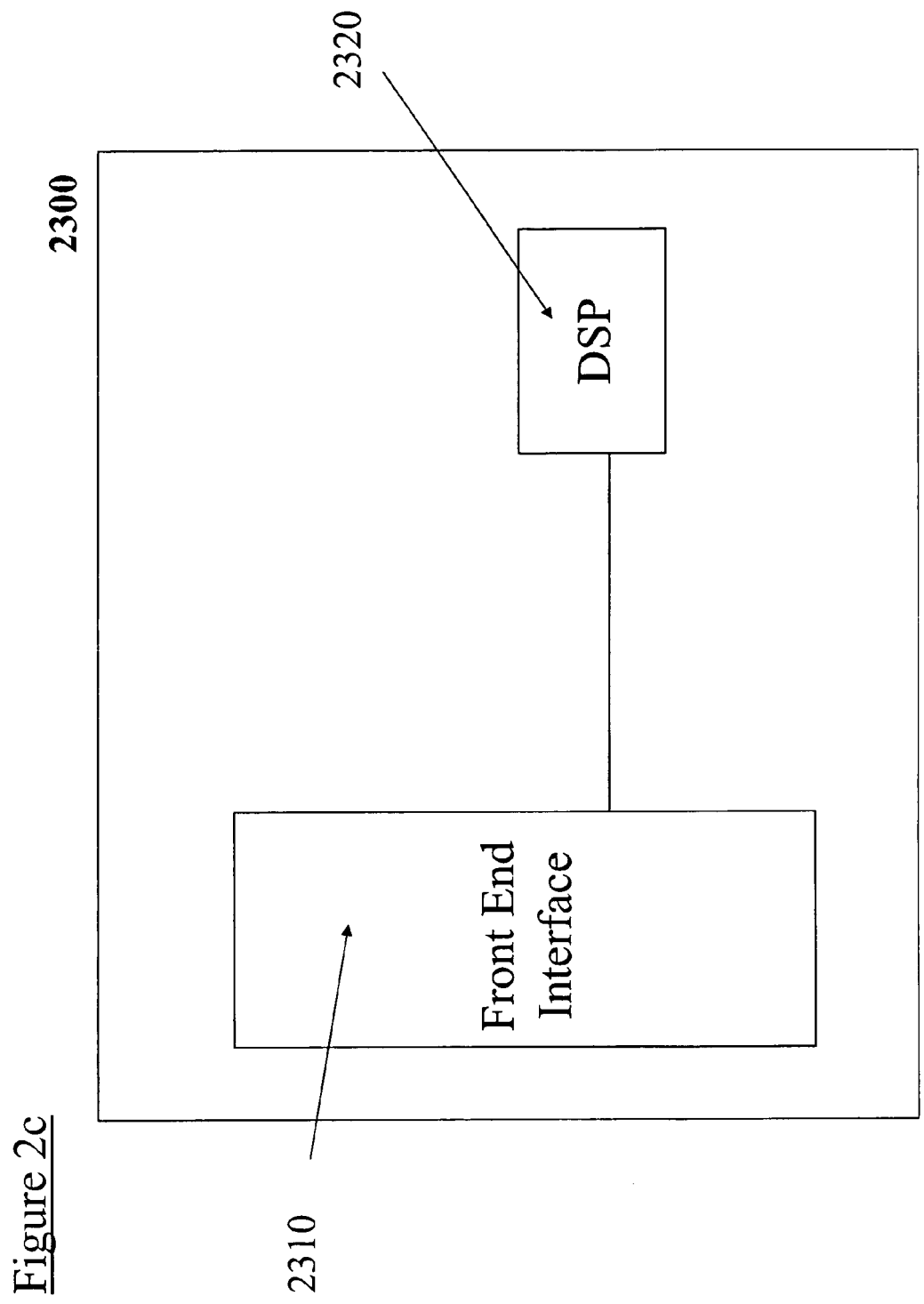
FIG. 2c is a block diagram of an exemplary digital unit according to a preferred embodiment of the present invention.

Reference is now made to FIG. 2c, which is a block diagram of an exemplary digital unit according to a preferred embodiment of the present invention.

In a preferred embodiment of the present invention, the digital unit 2300 has a front-end interface 2310, which receives serial inputs of sampled signals from the various front-end units 2200 and arranges them into a DSP usable parallel representation. A digital signal processing (DSP) core 2320 which reads the sampled data, processes it and determines the position of the physical objects, such as stylus or finger. The determined position is sent to the host computer via link. Further information is provided under the heading "Digital unit", in U.S. patent application Ser. No. 10/649,708 ("Transparent digitizer").

In a preferred embodiment, the digital unit 2300 and the front end unit 2200 are incorporated together in a detector unit.

In this preferred embodiment of the present invention, the controller 230 is implemented on the digital unit 2300, for dynamically selecting a tracking window 240 for each detected physical object, the tracking window comprising a subset of the conductive lines, for tracking each respective object, to determine and keep track of the location of the object.

In a preferred embodiment of the present invention, the controller 230 applies two operation modes—scanning mode and tracking mode, to each of the detected physical objects.

Figure 3:
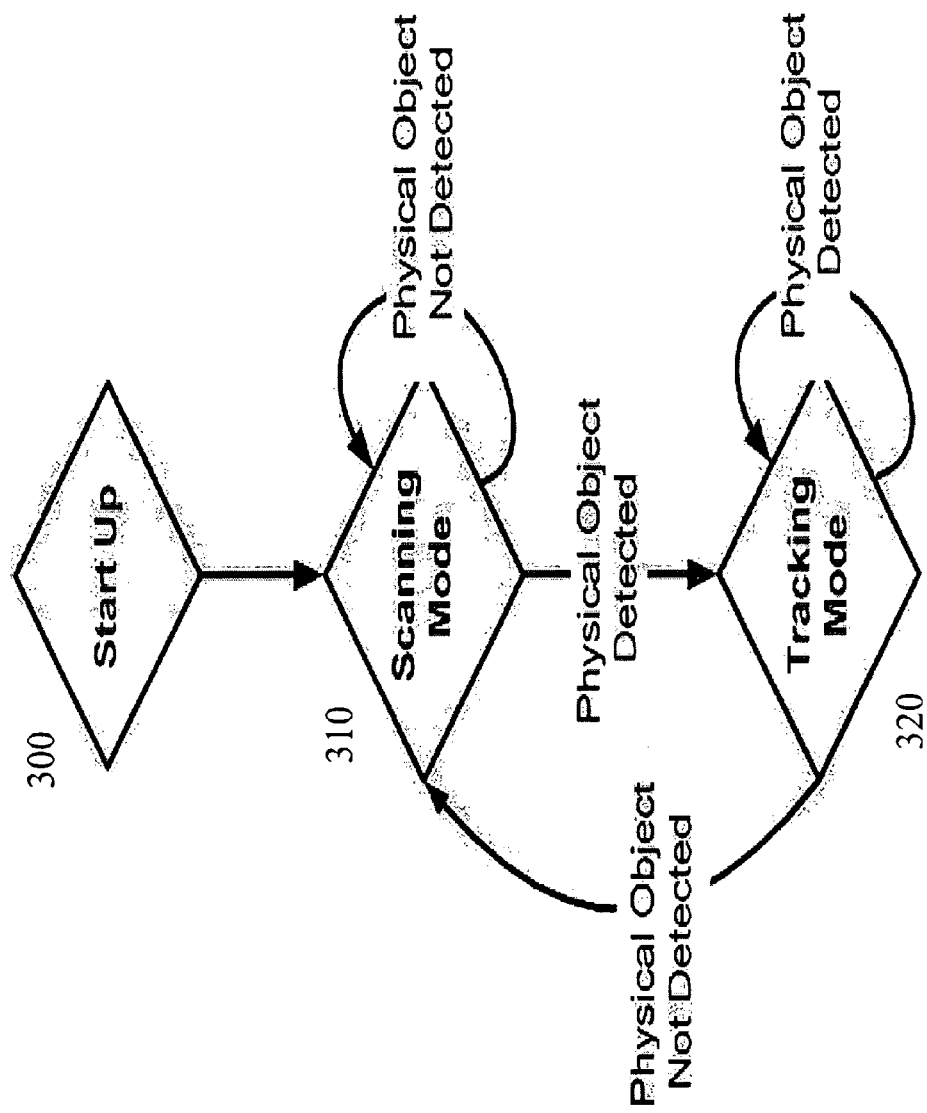
FIG. 3 is a flow simplified diagram illustrating possible transitions between operation modes, according to a preferred embodiment of present invention.

Reference is now made to FIG. 3 which is a simplified flow diagram illustrating possible transitions between operation modes, according to a preferred embodiment of present invention. Upon initialization 300 the system goes straight to scanning mode 310. Scanning mode remains active all the time that physical objects are not detected at the sensing area. The system switches to tracking mode 320 as soon as a physical object is detected. Tracking mode 320 is active while tracking the movements of a physical object at the sensing area. When the physical object is removed from the sensing area, the system switches back to scanning mode 310.

Separating the scanning mode 310 from the tracking mode 320 makes it possible to use different detection techniques for each mode. Thus the objective of tracking mode 320 is to keep track of the precise position of the physical object, and in order to obtain such precision the sensing elements 210 are scanned rapidly using a high scanning rate. Furthermore, the frequency of the object is determined in the scanning mode 310, thus the excitation pulse used in tracking mode 320 includes only the frequency of the detected object, or a very narrow range of frequencies around the frequency of the detected object.

When both the frequency and the position of the object are unknown, the objective of the controller 230 is to find the approximate location and frequency of the physical object. In order to find the approximate location and frequency, all the sensing elements are sampled and all the signals are processed, using wide range excitation pulse(s).

In order to cover a wide range of frequencies in the scanning mode 310, the digitizer may choose one of the following options: applying one excitation pulse, that is a superposition of a large number of frequencies within a wide range, periodically applying several pulses each being a superposition of a small range of frequencies, and periodically applying several pulses, each having a single and distinct frequency.

Once the location and frequency of the physical object, for example—a stylus, are roughly determined, the controller scans for the exact detection frequency of the stylus.

Scanning for the exact frequency of the stylus, the controller triggers applying an excitation pulse in a narrow range of frequencies, around the determined approximate frequency of the stylus, on sensing elements in the whereabouts of the approximate stylus location.

For example, in a preferred embodiment of the present invention, a digitizer is used for searching for an electromagnetic stylus. When searching for signs of an electromagnetic stylus, not only the physical location is unknown, but also the frequency of the stylus. Hence the excitation is preformed using a wide range of frequencies.

The approximate stylus position and frequency are determined when a signal is detected on at least one of the sensing elements. Having determined the approximate stylus location, the digitizer triggers an excitation cycle and samples the sensing elements around the approximate location of the stylus. The excitation signal that is applied is a superposition of signals within a narrow range of frequencies. The applied signal is used to find the exact frequency and location of the stylus.

In a preferred embodiment of the present invention, the digitizer first determines the location of the physical object, and then scans to find its precise detection frequency. Other embodiments may choose to reverse the order of operation: first finding the detection frequency and then searching for the location.

In some embodiments, the digitizer may track several passive electromagnetic objects each having a different frequency. For example, electromagnetic game pieces containing resonance circuits as described in U.S. Pat. No. 6,690,156, herein incorporated by reference.

In such cases the digitizer preferably uses an appropriate range of excitation frequencies in order to energize all the different electromagnetic objects.

A tracking window 240 is created for each electromagnetic object, as described in detail below.

Since the objective of the scanning mode 310 is to establish the approximate location of the physical object, it is not necessary to maintain high signal to noise ratio (SNR). Low SNR requires less sampling, hence the sampling rate can be lower than in tracking mode 320. Furthermore, the energy level of the excitation pulses can be reduced as well.

Lower sampling rates enable the digitizer to use several excitation pulses, each pulse being a superposition of a limited number of frequencies. In this case the excitation pulses are applied in a cyclic manner until the physical object is detected. Using such pulses instead of pulses that are superpositions of all possible frequencies may prove economical as the latter pulses are heavy power consumers, as described above.

In one preferred embodiment of the present invention the excitation is preformed by applying a set of excitation pulses, each having a distinct frequency. At each operation cycle the digitizer applies a different excitation pulse. At each operation cycle the controller analyzes the signals originating from the antennas of the sensor. Upon detection the frequency of the detected object is determined according to the recently used excitation pulse. Nevertheless, the excitation pulse applied by the digitizer and the detection frequency of the physical object are not necessarily related.

In another preferred embodiment of the present invention, the digitizer excitation frequency is different from the detection frequency. At each cycle, the digitizer applies one excitation pulse of a distinct frequency and searches for signals of at least one possible frequency in order to determine the existence of an object.

During scanning, the digitizer may sample all the sensing elements and process all the signals originating from these elements. An additional advantage of maintaining low sampling rate is that the sensing elements may be sampled in several steps Since the sampling rate is low and there is no need for precise location of the stylus, there is in fact no need to sample all the sensing elements simultaneously. Thus, the sampling can be separated into several steps, and in each step a different portion of the sensing elements may be sampled and processed.

The object's detection frequency may vary according to its status, variations in the manufacturing process etc. For example, an electromagnetic stylus may emit one frequency when hovering and another frequency when it contacts the sensor. In some cases, the stylus may change its detection frequency according to the amount of pressure applied on the stylus tip. The frequency of the stylus may thus change during interaction with a user. Due to this, the system transitions between tracking mode and scanning mode are slightly modified.

When the digitizer is in tracking mode 320 and it can no longer sense the stylus there are two possible scenarios: the stylus is removed from the sensing area, or the stylus changes its frequency but remains in approximately the same position.

Figure 4:
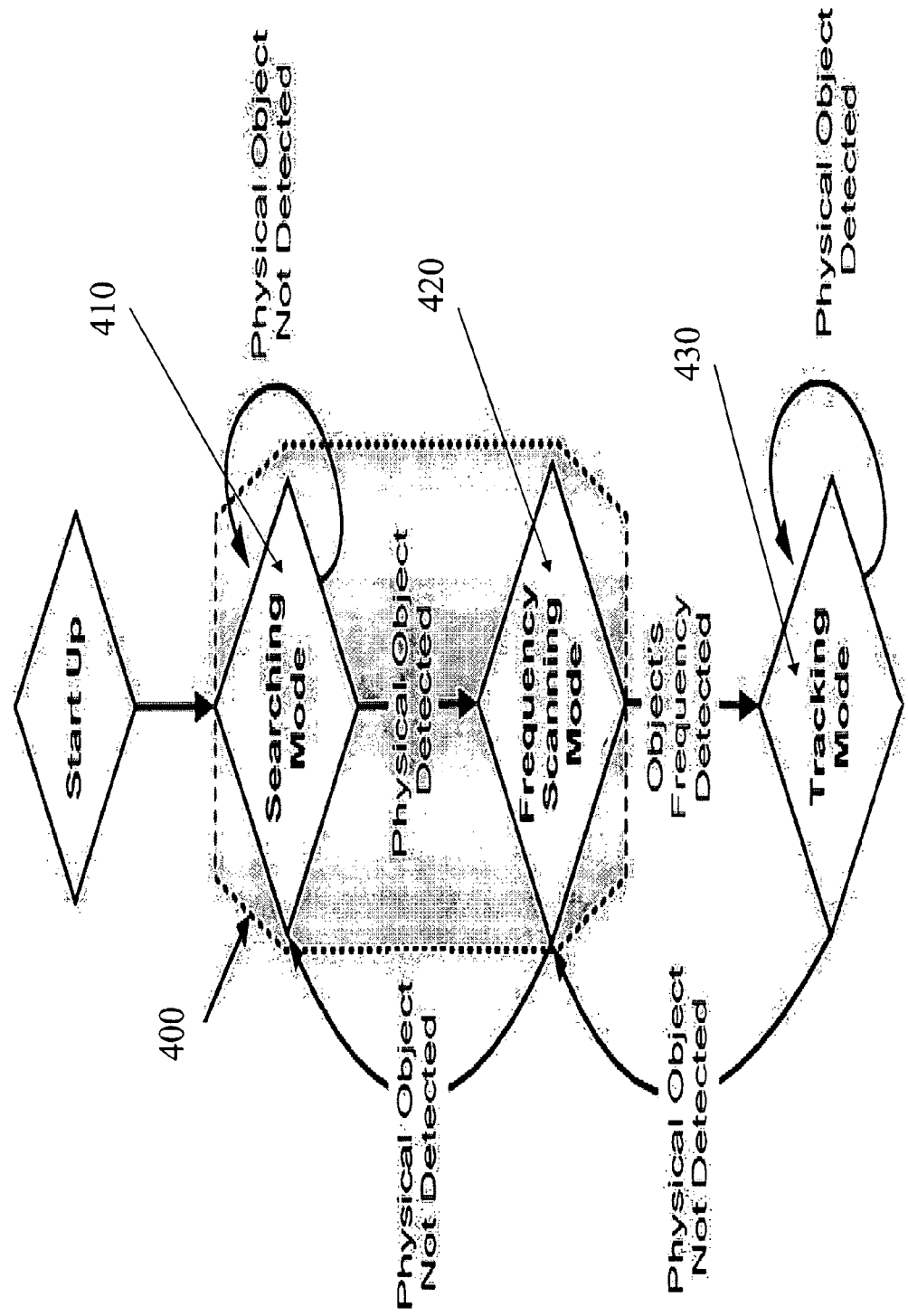
FIG. 4 is another simplified flow diagram illustrating possible transitions between operation modes, according to a preferred embodiment of present invention.

Reference is now made to FIG. 4 which is another simplified flow diagram illustrating possible transitions between operation modes, according to a preferred embodiment of present invention.

In a preferred embodiment of the present invention, a stylus hovers in close proximity to the apparatus 200. In this example the stylus changes its frequency as an indication of its status and has different frequencies for hovering (fh) and contacting (fc) the sensing area.

First, the apparatus 200 searches 410 for the stylus approximate location and frequency utilizing at least one excitation frequency. Once the stylus position is roughly determined, the apparatus 200 may scan, if needed, for the precise frequency of the stylus (fh) 420. For cases where one distinct excitation frequency is used per operation cycle which is a direct indication for the object's frequency, the frequency scan stage 420 is redundant.

Searching for the stylus approximate location 410, as well as pinpointing the frequency 420 of the stylus, are both parts of the scanning mode 400. After both position and detection frequency are established the controller 230 switches to tracking mode 430. In tracking mode, the digitizer starts following the stylus movements as it hovers in close proximity to the sensing area 220. Tracking mode 430 continues as long as the frequency of the stylus remains fh, and the stylus keeps hovering in close proximity to the sensing area 220.

However, when the stylus touches the sensing area 220, the frequency of the stylus changes and makes the stylus invisible to the sensing elements 210. In this preferred embodiment, in such a case, instead of switching back to searching mode 410, the controller 230 assumes that the stylus position was not changed dramatically since the last sample and returns to frequency scanning mode 420, to find the new detection frequency of the stylus within the current tracking window. If the controller 230 is unable to find the stylus within the current tracking window 240 it concludes that the stylus was removed and switches back to the searching mode 410.

In a preferred embodiment of the present invention, the controller 230 implements tracking mode 430 by utilizing a selected tracking window 240, which comprises a portion of the sensing elements 210 and a single excitation frequency for physical object location.

The sensing elements 210 in the tracking window 240 are selected according to a previous location of the physical object, and one or more of the following: speed of the physical object, acceleration of the physical object, direction of progress of the physical object, and any other parameter that is deduced by analyzing the history of the physical object.

That is to say, the sensing elements are dynamically reselected, so as to form a frame whose center is the expected or previously known position of the moving object.

Preferably, the physical object location is determined by the last available samples, whether they are obtained in scanning mode 420 or in tracking mode 430.

Figure 5:
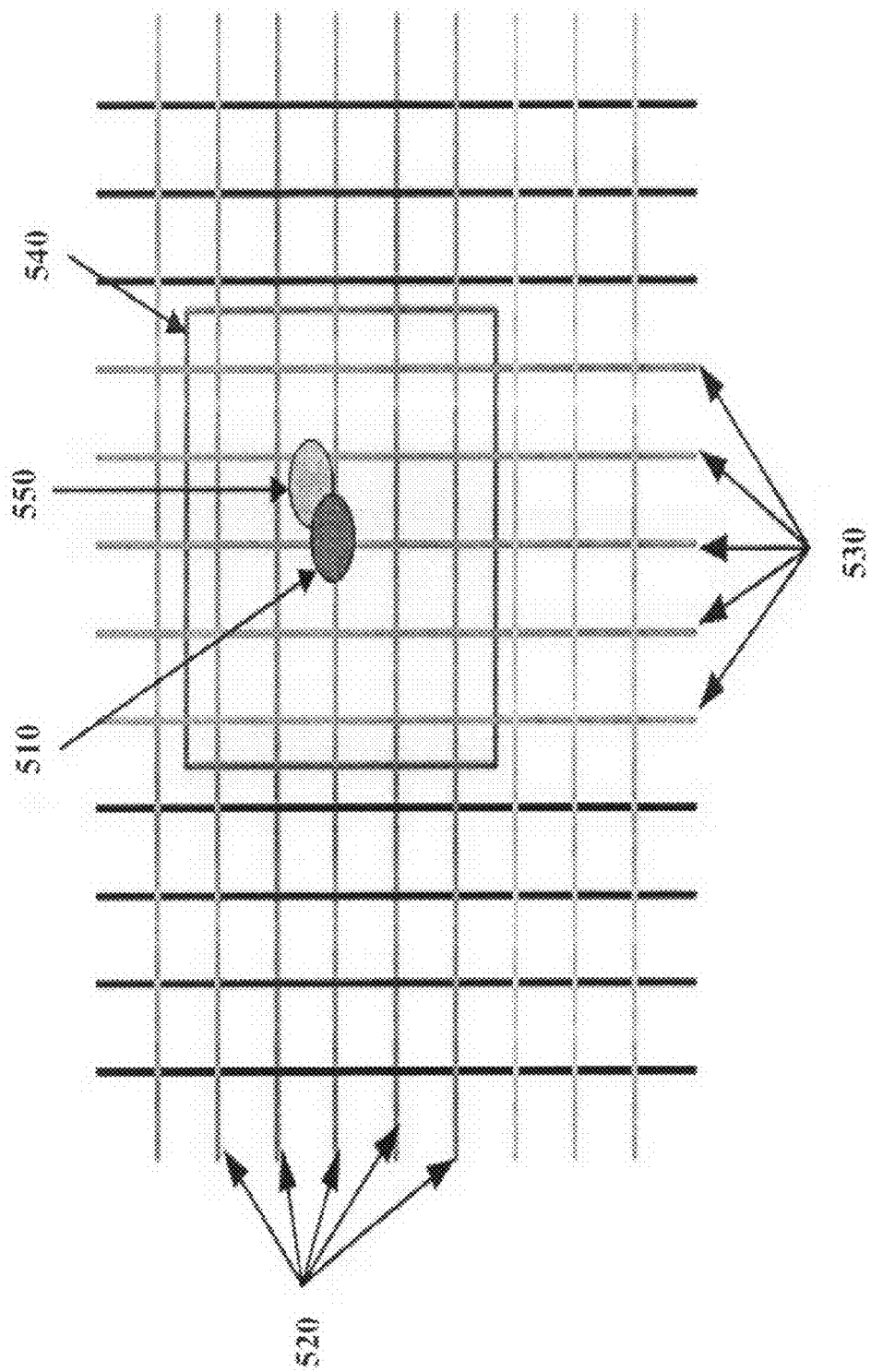
FIG. 5 illustrates a tracking window, according to a preferred embodiment of the present invention.

Reference is now made to FIG. 5 which illustrates a tracking window, according to a preferred embodiment of the present invention.

In this preferred embodiment, the controller 230 chooses to utilize only the sensing elements 210 in close proximity to the last calculated location of the physical object 550. For example, the controller 230 may select lines on X axis 520 and lines on Y axis 530. When in tracking mode the controller 230 can sense a specific area on the sensing area 220, by sampling only the sensing elements 210 within the tracking window 540. Using only a subset of the sensing elements 210 ensures a fixed update rate regardless of the size of the sensing area 220.

A preferred embodiment implements a tracking window 540 of fixed size, having a predetermined number of sensing elements (antennas) on each axis. The number of antennas on the X axis is not necessarily equal to the number of antennas on the Y axis.

In another preferred embodiment, the tracking window may have a dynamic size. For example, the sensing elements in the tracking window 540 may be selected according to the speed and acceleration of the object. In this case, the tracking window is spread across a wider area as the speed or acceleration of the object increases. The maximum size of the tracking window 540 may be limited according to the specific hardware configuration, the specific software considerations, or both.

Reference is now made again to FIG. 2.

Tracking can be performed on three levels:

1. Signal processing—the controller 230 processes only signals originating from the sensing elements 210 within the tracking window 240. In this case, all the sensing elements 210 are excited and sampled, but only a portion of the signals are processed to determine the location of the object. Limiting the signal processing reduces the computational power for the apparatus 200.

2. Hardware configuration—The next level of tracking is when only the sensing elements that are selected for the tracking window 240 are sampled, though all of the sensing elements are excited.

This preferred embodiment can reduce the required hardware components as well as the computational power and the energy requirements. For example, consider a digitizer implementing a tracking window 240 for tracking an electromagnetic stylus. The excitation is peripheral, which means that the entire surface of the sensor is susceptible to the stylus signal.

In order to determine the stylus location, the digitizer samples only the sensing elements (antennas) within the tracking window 240, hence signals that are not originating from the tracking window 240 are discarded by the detection hardware. Later, the digital unit processes only the signals originating from the tracking window 240.

3. Selective excitation—The final level is when the excitation is applied only to the antennas within the tracking window 240, and only the signals originating from these antennas are sampled and processed.

For example, consider a digitizer implementing a tracking window for tracking finger touch. Touch detection is implemented by utilizing the capacitive coupling between adjacent sensing elements (antennas) 210. In scanning mode all the antennas on the X axis are excited, one at a time, while the antennas on the Y axis are sampled. Then the antennas on the Y axis are periodically excited while the antennas on the X axis are sampled. This process is continued as long as there is no indication of a touch event. Once there is an indication of a touch event there is no longer a need to use all the antennas, and the controller 230 switches to a tracking mode.

In tracking mode the controller 230 applies the excitation only to the antennas constructing the tracking window 240, hence the sensing elements 210 are susceptible to touch only when it occurs within the area of the tracking window 240, and the digitizer samples and processes only the signals originating from the tracking window 240.

A preferred embodiment of the present invention implements detection of more then one physical object. For example, a digitizer system may be designated to detect two styluses in two different frequencies ($f_1$ and $f_2$). The styluses can be present on the sensing area either separately or simultaneously.

The scanning mode utilizes the frequencies of both styluses for external excitation. Qualitatively, the excitation signal is a superposition of two sinus signals according to the respective frequencies of the two styluses. Practically, each stylus may emit signals in a narrow range of frequencies around its designated frequency. Therefore, the excitation signal is in fact a superposition of signals in the range of $f_1 \pm \Delta f'$ and $f_2 \pm \Delta f''$.

A preferred embodiment of the present invention utilizes sensing elements 210 comprising conductive antennas. The antennas are sampled and the signals are filtered around the relevant frequencies. When a signal is detected in the range of $f_1 \pm \Delta f'$ the digitizer concludes that the first stylus is present. When a signal is detected in the range of $f_2 \pm \Delta f''$ the digitizer concludes that the second stylus is present. Once the digitizer identifies a certain stylus it implements a tracking window 240 for the detected stylus, so that if the two styluses are simultaneously present then each is assigned its own tracking window. In this example the excitation frequency and detection frequency of each stylus are closely bound. In fact, each stylus is energized and emits signals in approximately the same frequency range $f \pm \Delta f$ in which it is excited. In other embodiments the excitation and detection frequencies are not necessarily in the same range. In such cases the detection utilizes a suitable detection frequency range, $f_d \pm \Delta f_d$, per stylus. The excitation is performed in a different range of frequencies $f_{exc} \pm \Delta f_{exc}$.

In one preferred embodiment of the present invention, the stylus is energized using one frequency, while emitting a second frequency. In this embodiment several styluses can be utilized, all being susceptible to the same excitation frequency, and differ by the frequency of their emitted signal. An example of such a stylus can be found in U.S. Provisional Application No. 60/631,862, entitled "Electromagnetic stylus for a digitizer system" (assigned to N-trig Ltd.).

Figure 6:
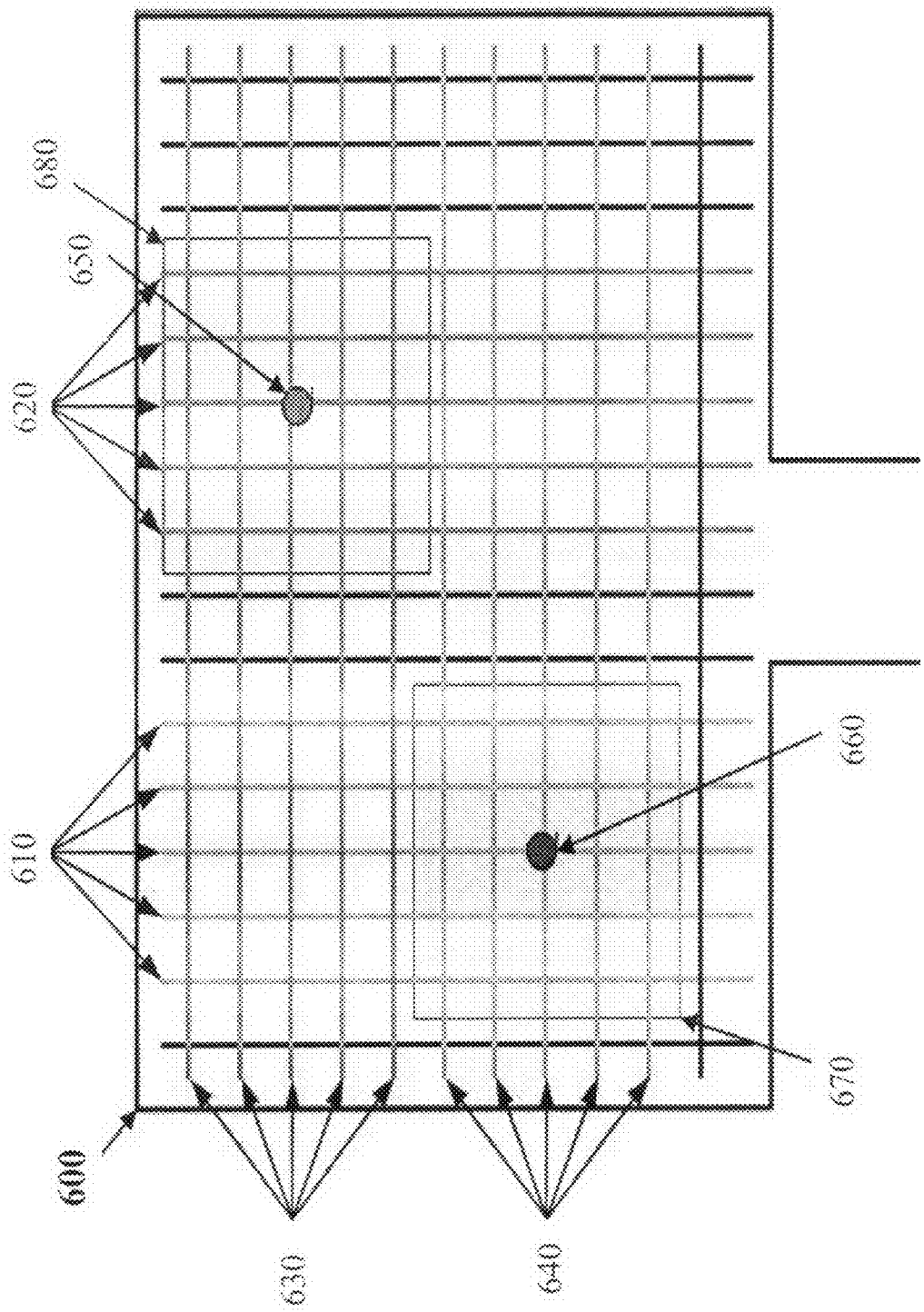
FIG. 6 illustrates multiple tracking windows for multiple stylus detection, according to a preferred embodiment of the present invention.

Reference is now made to FIG. 6 which illustrates multiple tracking windows for multiple stylus detection, according to a preferred embodiment of the present invention.

In a preferred embodiment of the present invention, two styluses 650, 660 are present at the sensing area 600. Once the first stylus 650 is detected, a digitizer implements a tracking window 680 for the first stylus, thus sampling a group of antennas on the X axis 620 and group of antennas on the Y axis 630, in order to keep track of the precise position of the first stylus.

At the same time the second stylus 660 may still be missing from the sensing area 600. In which case, the digitizer continues to scan all the antennas for signals in the detection frequency of the second stylus 660.

When both styluses are detected two tracking windows 670, 680 are implemented simultaneously, one for each stylus 650, 660

When one of the styluses is removed from the sensing area 600, the digitizer returns to scanning all the antennas at the detection frequency of the missing stylus. That is to say, the digitizer carries out searching for the removed object, and tracking for the object which is still detected in the sensing area 600.

The tracking windows may overlap, thus some antennas may exhibit signals in detection frequencies $f_1$ and $f_2$. In this embodiment, the styluses are designed to have different detection frequencies. Each stylus is unaffected by the detection frequencies of the other electromagnetic objects in the system. Therefore, many styluses can be detected simultaneously and independently.

A preferred embodiment of the present invention involves a combined detection of stylus and finger touches.

In order to distinguish between the stylus and finger, the finger detection frequency is different from the stylus detection frequency. The digitizer uses a range of frequencies for external excitation for stylus detection and a different frequency to oscillate the antennas and enable finger touch detection.

Figure 7:
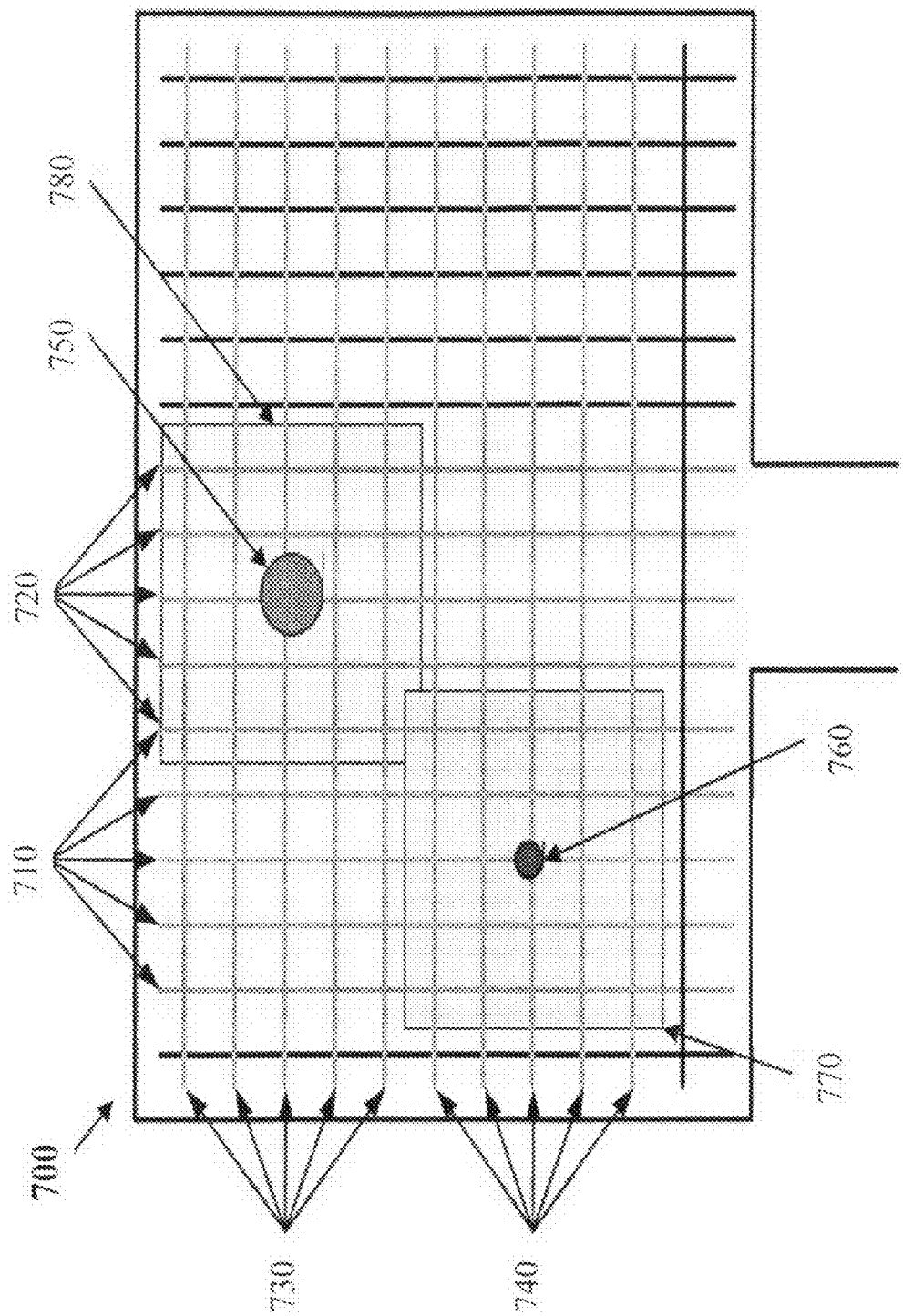
FIG. 7 illustrates multiple tracking windows for touch and stylus detection, according to a preferred embodiment of the present invention.

Reference is now made to FIG. 7 which illustrates multiple tracking windows for touch and stylus detection, according to a preferred embodiment of the present invention. A separate tracking window is created for the stylus and a separate tracking window is created for the finger. The finger of a user 750 and an electromagnetic stylus 760 are present at the sensing area 700.

The digitizer implements two tracking windows 770 and 780, one for each user interaction 750, 760. A group of antennas on the Y axis 740 is sampled for stylus detection, while another group 730 is sampled for touch detection. The tracking windows 770, 780 may overlap. Thus one or more antennas used for stylus detection may be also used for touch detection. For example, the antennas used for stylus detection on the X axis 710 contain one of the antennas used for touch detection 720 on the X axis.

Figure 8:
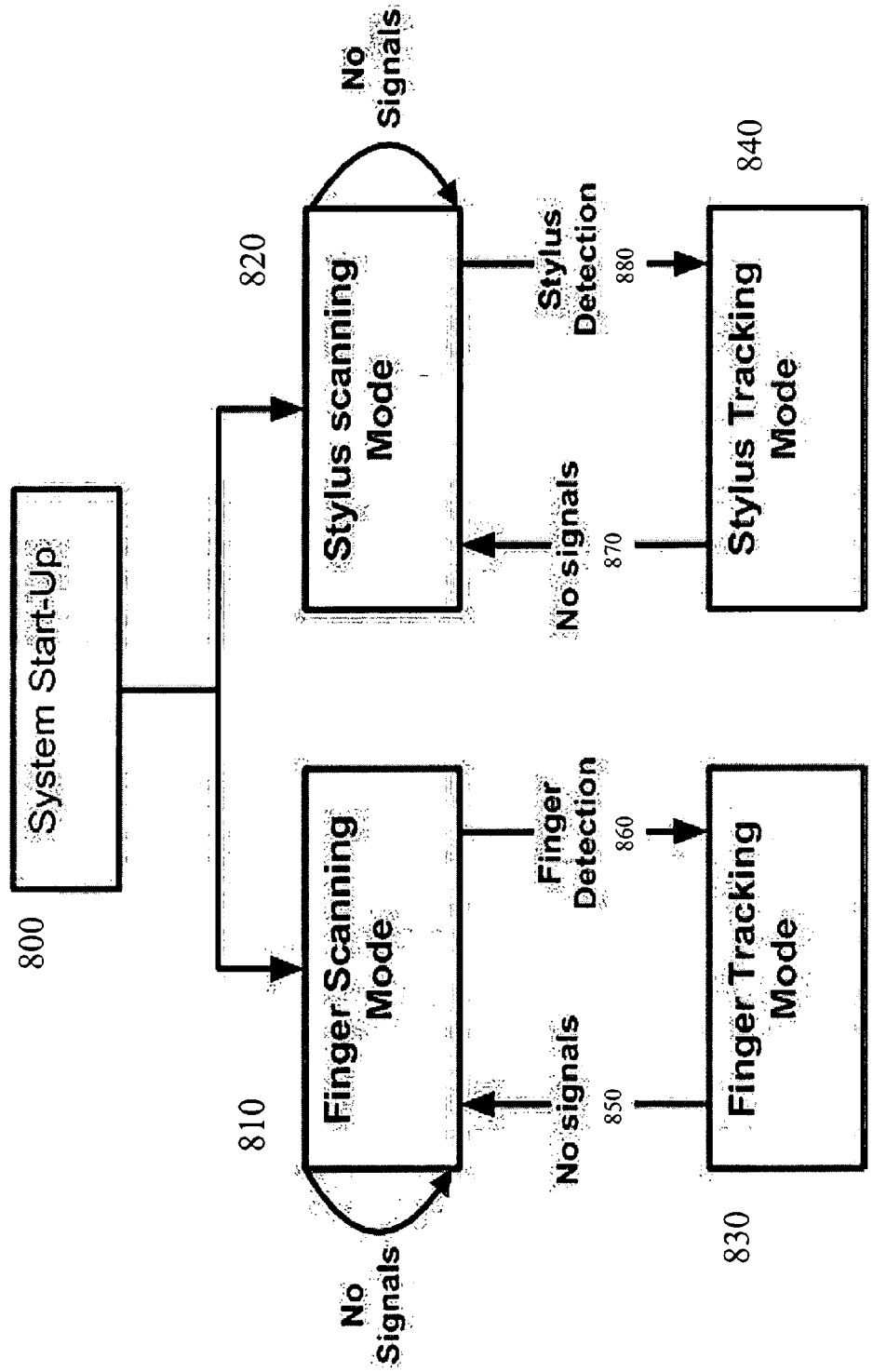
FIG. 8 is a flow chart illustrating an operation sequence when detecting both finger touches and an electromagnetic stylus, according to a preferred embodiment of the present invention.

Reference is now made to FIG. 8 which is a flow chart illustrating an operation sequence when detecting both a finger touch and an electromagnetic stylus, according to a preferred embodiment of the present invention.

Upon system initialization 800 a digitizer starts two independent scanning procedures one for touch detection 810 and another for stylus detection 820. Since stylus detection and finger detection apply one frequency for the stylus and a different one for the touch, both scanning processes can co-exist without interrupting each other. The external excitation required for stylus detection is performed in pulses. Therefore the antennas excitation required for finger detection can be performed in the time slots when the external excitation is inactive. This feature enables the use of one oscillator for both the external excitation and the antennas excitation, as well as simultaneous sampling of both stylus and finger signals.

In a preferred embodiment the stylus scanning mode 820 uses a superposition of several frequencies within a predetermined frequency range in order to energize the stylus. For example, if the stylus frequency changes from $f_1$, when hovering in the proximity of the sensor, to $f_2 = f_1 + \Delta f$ when in contact with the sensing area, the external coil should be excited in both $f_1$ and $f_2$ in order to detect the stylus in both cases.

Furthermore, when manufacturing the stylus there may be slight variations in the values of the electrical components. As a result each stylus may have a slightly different frequency. To ensure the stylus is detected the excitation should be performed in a range of frequencies, $(f_1 \pm \Delta f)$, around the designated excitation frequency $(f_1)$. While scanning, all the antennas are sampled and processed in order to determine the existence of the stylus.

In another preferred embodiment, the stylus is energized using one frequency and emits a signal in one of several possible frequencies or frequency ranges. Nevertheless, due to manufacturing variations the excitation pulse is constructed of a range of frequencies around the designated excitation frequency.

In the finger scanning mode 810 the antennas are oscillated in the finger detection frequency, $f_3$. As stated above, the antennas are oscillated in the time slot between the external excitation pulses. The antennas are sampled when they are oscillated.

If the stylus is present at the sensing area the digitizer senses the decaying signal of the stylus 880. When a user touches one or more antennas the digitizer senses the finger induced signal in the finger detection frequency 860. Since stylus and finger signals are in different frequencies they are unaffected by one another thus allowing their simultaneous detection.

The digitizer concludes that a stylus is present at the sensing area when the sampled signals indicate the presence of at least one element within the stylus frequency range. When the stylus is detected 880 the digitizer switches to stylus tracking mode 840. In stylus tracking mode the external excitation coil is excited in a narrow frequency range around the stylus excitation frequency and the digitizer checks only a portion of the antennas for signals in the stylus detection frequency.

When a finger is detected 860 the digitizer switches to finger tracking mode 830, in which only a portion of the antennas are oscillated and sampled.

When the finger is removed from the sensing area, no finger signal is detected 850 and the digitizer switches back to the finger scanning mode 810.

Likewise, when the stylus is removed from the sensing area or changes its detection frequency, no stylus signal is detected 870 around the designated detection frequency of the stylus, and the digitizer switches back to a stylus scanning mode 820.

Since stylus and finger detection are independent, the digitizer can operate in any of the following combinations: Stylus Scanning Mode 820+Finger Scanning Mode 810, Stylus Tracking Mode 840+Finger Scanning Mode 810, Stylus Scanning Mode 820+Finger Tracking Mode 830, Stylus Tracking Mode 840+Finger Tracking Mode 830.

When the digitizer is in tracking modes for both stylus 830 and touch 840, the finger signals are easily distinguished from the stylus signals because they are at a different frequency. However, finger touch may induce noise signals at the stylus frequency which makes stylus detection harder. In such case a noise removal algorithm can be implemented in order to eliminate noise in the stylus frequency. Such a noise removal algorithm is described in U.S. patent application Ser. No. 11/063,535, by N-trig, entitled "Noise removal algorithm for digitizer systems", the content of which is hereby incorporated herein by reference.

In one embodiment noise removal is achieved by creating a window from a subgroup of the conductors, as described above. However, instead of all the conductors in the subgroup being continuous and defining the window rectangle, one conductor is added which is remote from the object being detected. The remote conductor is assumed only to carry noise. The signal on the remote conductor is then used as a reference signal to subtract noise from the window.

System Architecture

The present embodiments may reduce the system requirement for hardware components as well as computational power, thus reducing costs.

Figure 9:
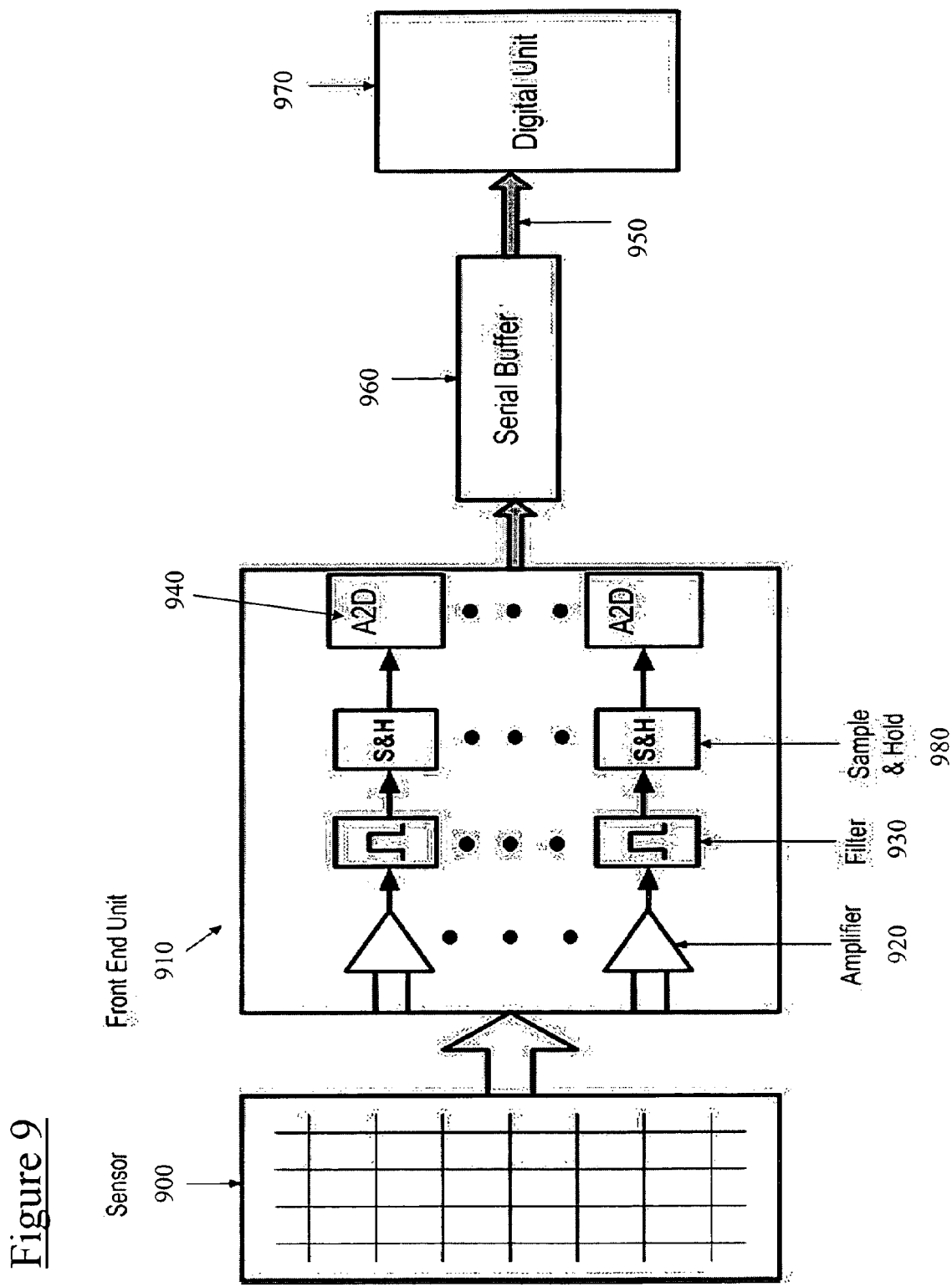
FIG. 9 is a simplified block diagram of architecture for a digitizer, according to a preferred embodiment of the present invention.

Reference is now made to FIG. 9 which is a simplified block diagram of architecture for a digitizer, according to a preferred embodiment of the present invention.

In a preferred embodiment of the present invention, a transparent sensor 900, comprised of a matrix of several sensing elements, is connected to a front end unit 910. The front-end unit 910 is mounted on the frame of the sensor. In the preferred embodiment, the front-end unit 910 receives a very low signal from the sensor 900. In a preferred embodiment, the sensing elements are antennas that are divided into pairs, each pair connected to a differential amplifier 920 within the front end unit 910.

Other embodiments may amplify the signals using a set of conventional amplifiers, rather then differential ones. The front end unit 910 amplifies 920 and filters 930 the received signals in order to eliminate irrelevant frequencies.

The filtered signals are kept stable using sample and hold components 980. The sample and hold components receive a clock signal (not shown) which controls the sampling rate of the antennas, by the sample and hold components 980. For example, one embodiment may implement 256 samples between two consecutive excitation pulses, in which case the sample and holds components 980 are opened by a clock signal, for providing the analogue-to-digital converter (A2D) 940 for the sampled signals, 256 times per a sampling period.

The filtered signals are sampled into digital representation using an analogue-to-digital converter (A2D) 940. The digital data is packed in a serial buffer 960 and forwarded to the digital unit 970, through the Bus 950 for further digital processing. The digital unit 970 is responsible for running the digital processing algorithms. The outcome of the digital process is the position coordinates of the physical objects present at the sensing area.

When tracking the movements of a physical object across the sensor 900, the update rate of the digitizer is relatively high. A low update rate would result in inaccurate detection and disrupted cursor movements.

As the digitizer is compelled to sample all the sensing elements, that is, the entire matrix of conductive antennas, while maintaining a high update rate, the front end unit 910 preferably contains an amplifier 920, a filter 930, a sample and hold component 980, and an A2D 940 for each pair of antennas.

Evidently, the amount of electrical components increases linearly with the amount of conductive antennas constructing the sensor 900. The linear dependence between the size of the sensor 900 and number of electrical components affects the cost of the device as well as its power consumption and other performance parameters.

The present embodiments attempt to reduce the number of electronic components required for smooth and accurate tracking of physical objects. Furthermore, the present embodiments may eliminate the dependence between the number of the electrical components and the sensor size. For example, the number of filters required in the present embodiments is equal to the number of differential signals that make up the active tracking window. A digitizer implementing tracking windows of ten antennas on the X axis and eight antennas on the Y axis is in fact using nine differential signals.

Therefore, only nine filters are necessary, regardless of the size of the sensor and the total number of sensing elements (antennas).

Figure 10:
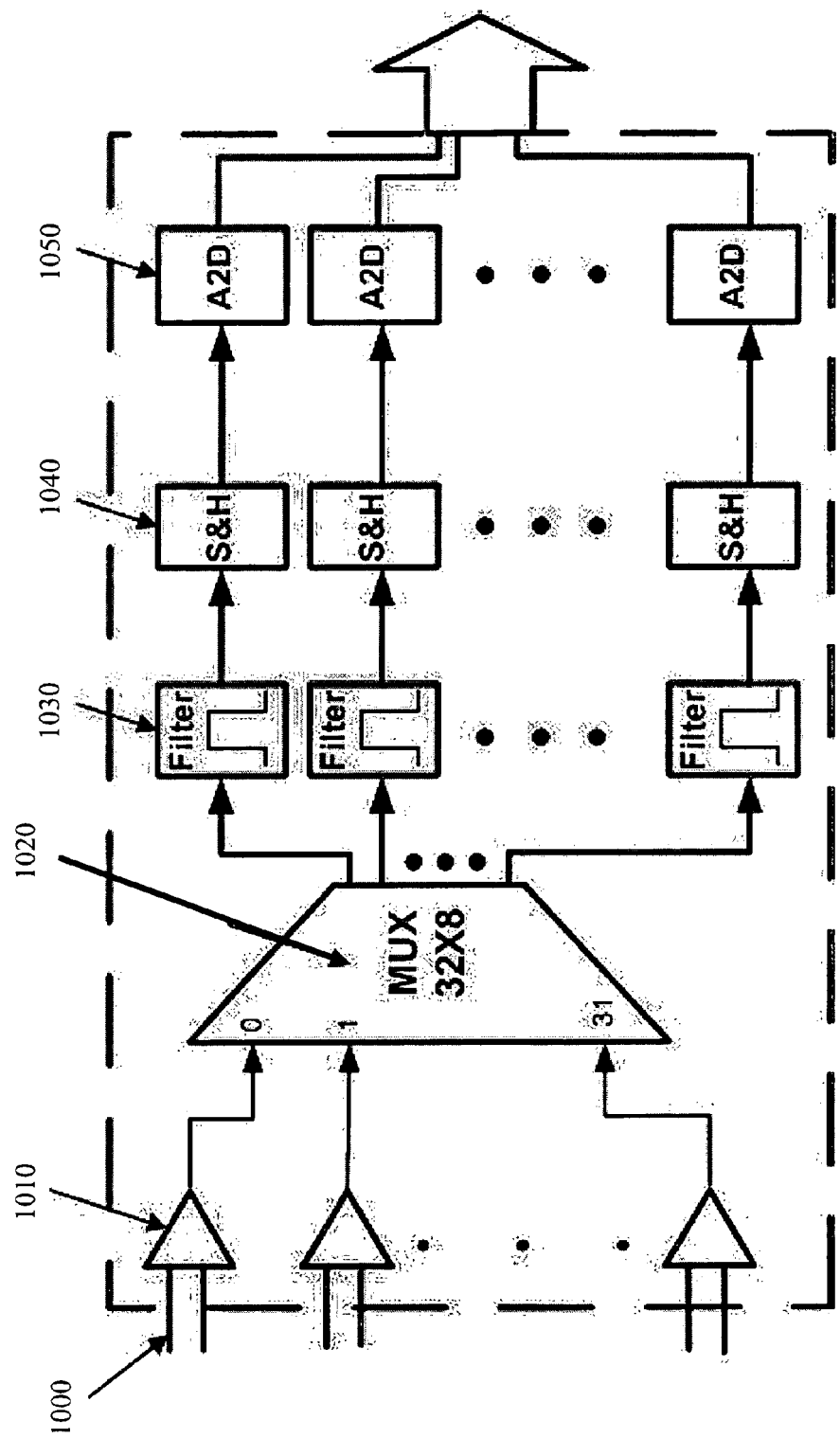
FIG. 10 is a block diagram of exemplary single axis processing architecture for an apparatus, according to a preferred embodiment of the present invention.

Reference is now made to FIG. 10 which is a block diagram of an exemplary single axis processing architecture for an apparatus, according to a preferred embodiment of the present invention.

In this embodiment, the axis contains 64 conductive antennas. The tracking window in this embodiment includes 8 differential signals from the axis. The received signals 1000 are amplified by differential amplifiers 1010. A multiplexer (MUX) unit 1020 selects the relevant differential signals. The relevant signals are filtered 1030, to eliminated unnecessary frequencies. This embodiment utilizes a 32×8 MUX 1020 which is configured to select the antennas constructing the tracking window, where the total number of antennas on the axis is 64, and a maximum of 16 antennas are included in the tracking window.

The MUX 1020 selects the differential signals of the antennas included the tracking window and forwards them to an A2D 1050 via a filter 1030 and sample and hold components 1040. The sample and hold components 1040 ensure that the signals remain stable while digitized by the A2D 1050.

The A2D 1050 digitizes only the differential signals included in the tracking window. Note that the number of required filters 1030 and sample and hold components 1040 is reduced to the number of differential signals participating in the tracking window.

The MUX unit receives signals from all the antennas. Thus as the digitizer sensing area becomes larger, the MUX unit has to receive signals from relatively distant conductive antennas. The conductive antennas may produce signals that are too weak to be carried over such a distance. In such a case, the signals are amplified and buffered in close proximity to the sensor and than sent to the distant MUX unit. Thus a split architecture apparatus emerges.

Figure 11:
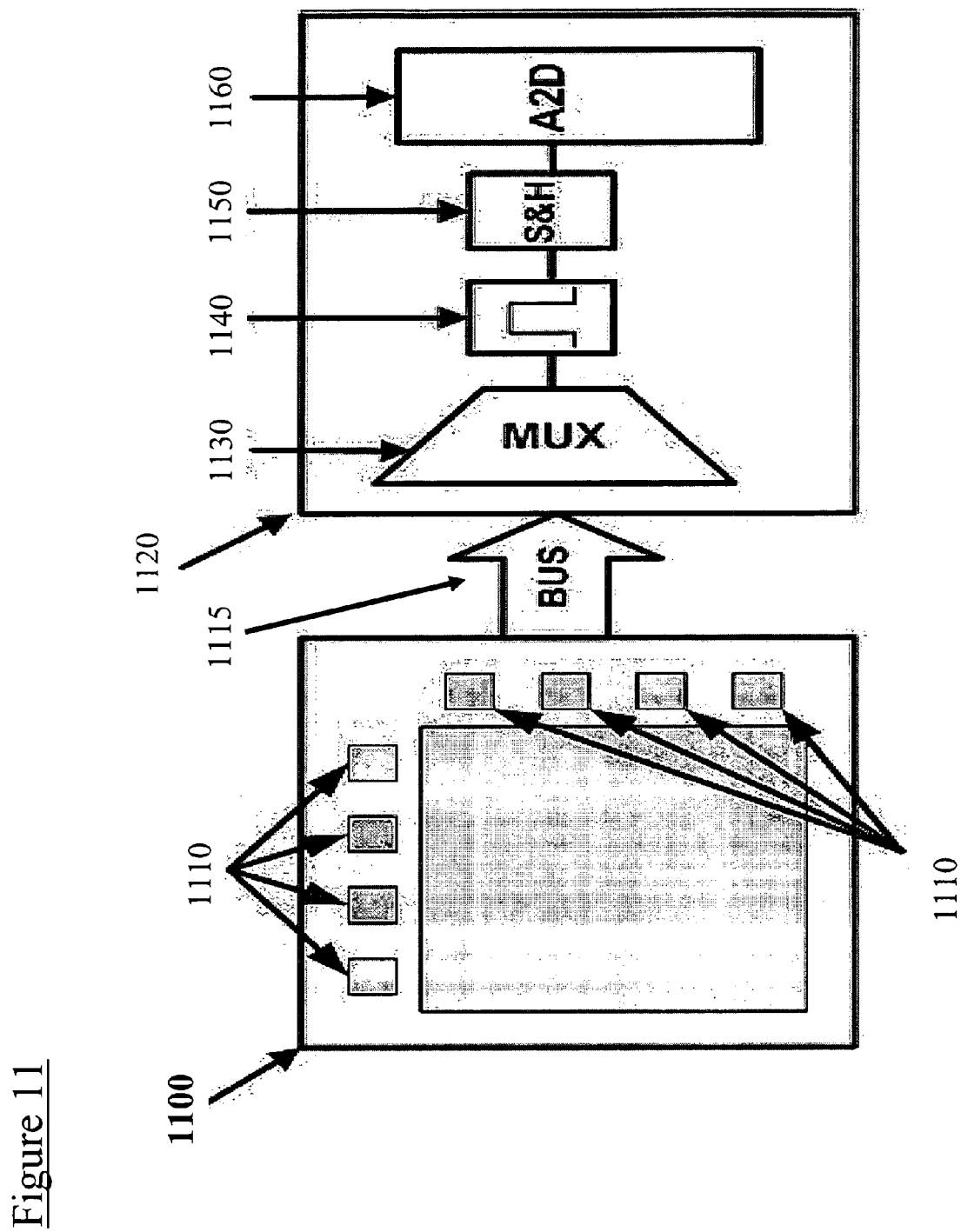
FIG. 11 is a block diagram of exemplary split architecture for an apparatus, according to a preferred embodiment of the present invention.

FIG. 11 is a block diagram of an exemplary split architecture for an apparatus, according to a preferred embodiment of the present invention.

In this embodiment, the front end unit is divided into two levels. The first level includes a set of ASICs 1110 spread across a sensor frame 1100. These ASICs are hereafter referred to as the front ASICs. The front ASICs 1110 contain the differential amplifiers, as mentioned in the previous sections (not shown).

In this preferred embodiment, the sensor is constructed of 64 antennas on each axis. There are four front ASICs 1110 per axis, each connected to 16 antennas and producing eight differential signals. Each front ASIC 1110 is located in close proximity to the antennas it amplifies. The MUX 1130, filters 1140, sample and hold components 1150 and A2D 1160 are located in a different ASIC 1120 which is hereafter referred to as the back ASIC.

Due to the fact that the signals received by the back ASIC are already amplified and buffered it can be located at a distance from the sensing elements (antennas). The signals are transferred from the front ASICs to the back ASIC through a BUS 1115.

Splitting the front end unit to front ASICS 1110 and a back ASIC 1120 enables an implementation of the present invention while reducing the amount of hardware components in the digitizer system.

The MUX

Implementing a 32×8 MUX that can select an arbitrary group of eight input signals is a complicated task. Such a design may consume considerable area within the front end ASIC.

The MUX design can be simplified if the selection is of eight neighboring input signals rather then any eight input signals.

Figure 12:
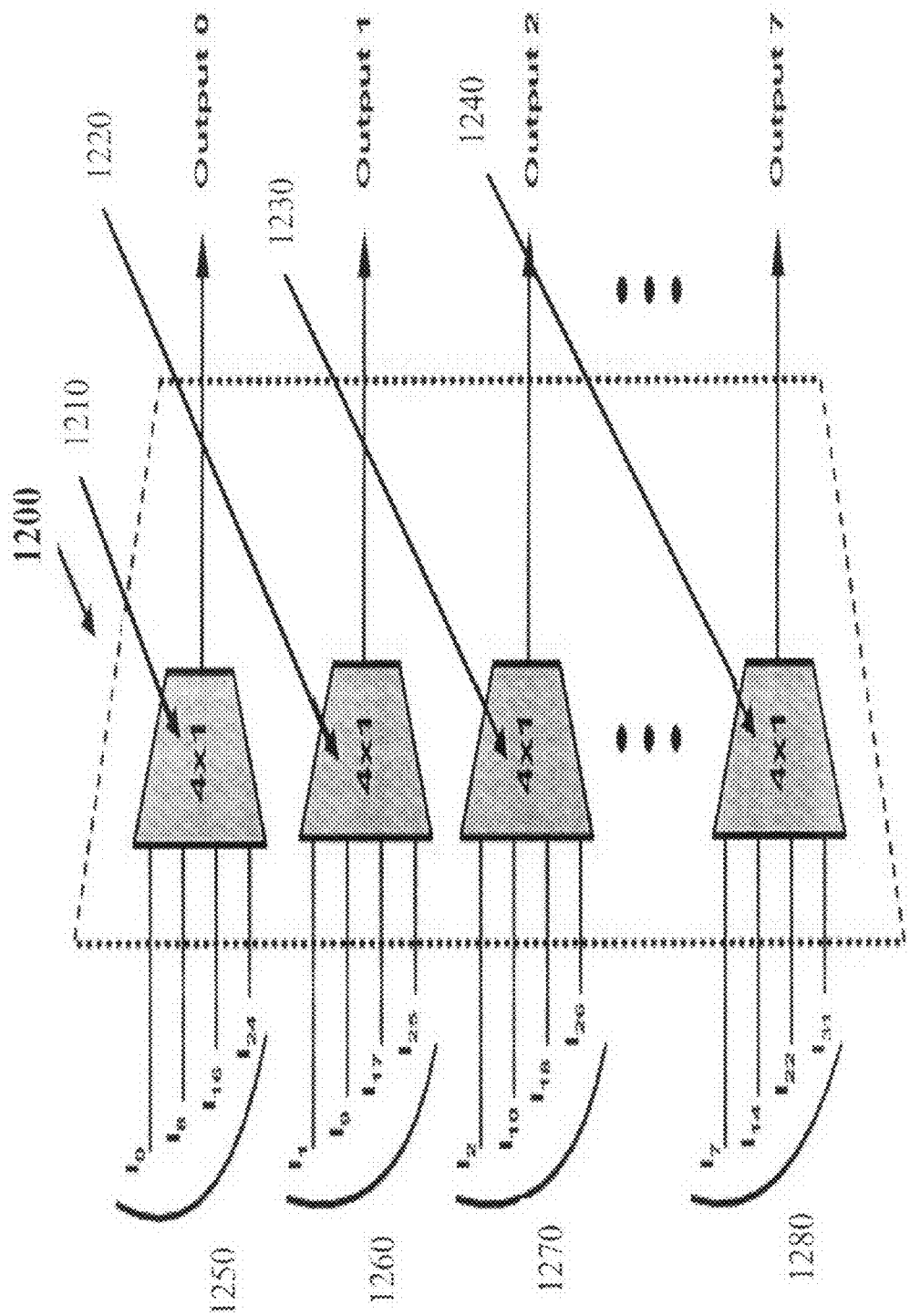
FIG. 12 is a block diagram of a 32×8 MUX according to a preferred embodiment of the present invention.

Reference is now made to FIG. 12 which is a block diagram of a 32×8 MUX capable of selecting 8 consecutive signals, according to a preferred embodiment of the present invention.

The MUX 1200 is constructed of eight 4×1 MUXes 1210-40. Each 4×1 MUX is input four signals. For example, the input signals to the MUXes are configured as follows: First 4×1 MUX 1210 receives inputs $\{I_0, I_8, I_{16}, I_{24}\}$ 1250, Second 4×1 MUX 1220 receives inputs $\{I_1, I_9, I_{17}, I_{25}\}$ 1260, Third 4×1 MUX 1230 receives inputs $\{I_2, I_{10}, I_{18}, I_{26}\}$ 1270, and so on until the Eighth 4×1 MUX 1240 which receives inputs $\{I_7, I_{15}, I_{23}, I_{31}\}$ 1280.

In a preferred embodiment the MUX unit is configured to select seven consecutive inputs and one arbitrary input. The ability to select an arbitrary input presents some complication to the MUX design. However, by providing the possibility to select an independent 8th antenna input, the digitizer may implement the noise reduction algorithm described in U.S. patent application Ser. No. 11/063,535, by N-trig, entitled "Noise removal algorithm for digitizer systems", which is hereby incorporated by reference. In this algorithm, the $8^{th}$ antenna is assumed to provide a noise only signal, and is thus used as a reference for the noise reduction algorithm.

Figure 13:
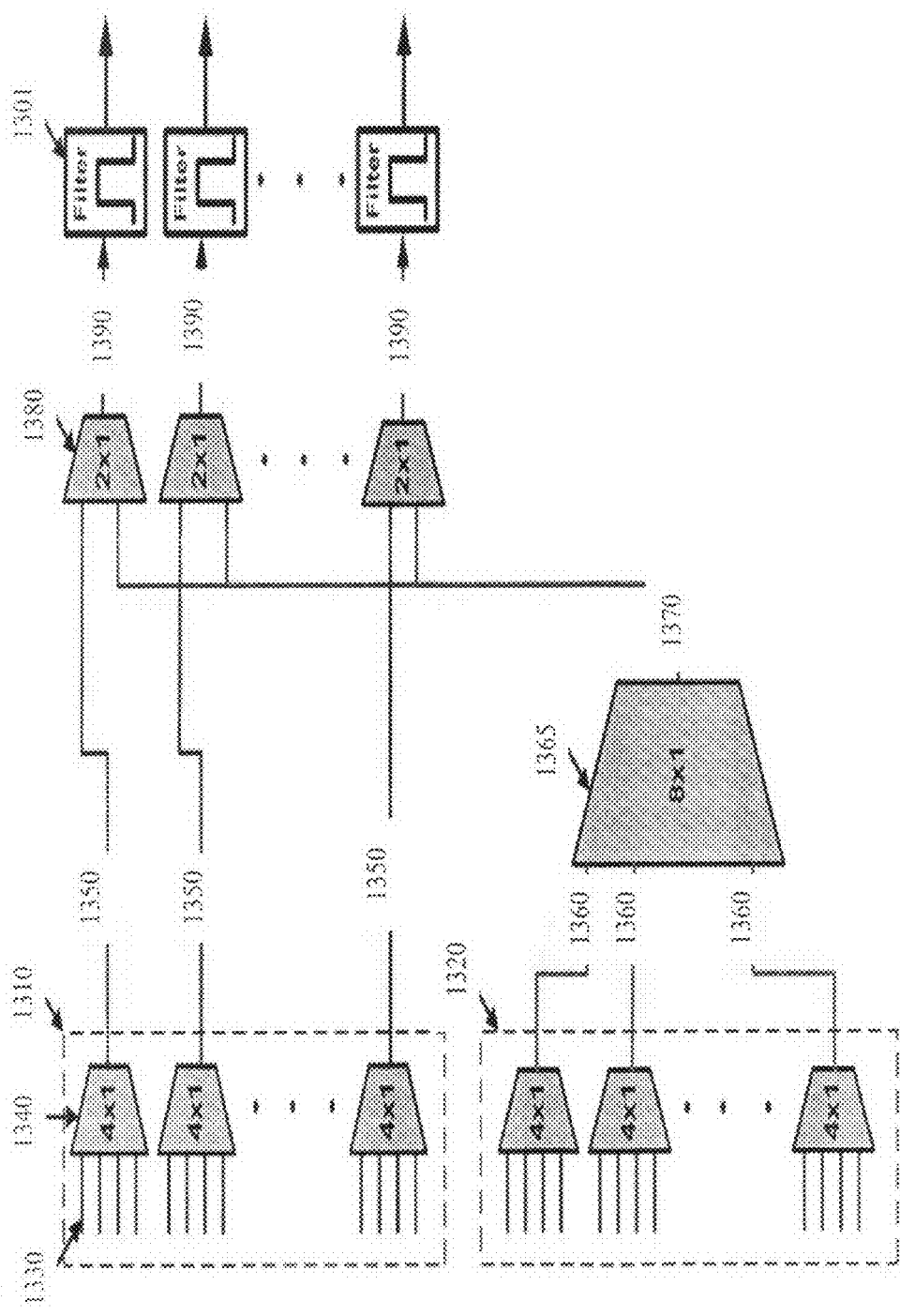
FIG. 13 is a block diagram of a second 32×8 MUX according to a preferred embodiment of the present invention.

Reference is now made to FIG. 13 which is a block diagram of a second 32×8 MUX according to a preferred embodiment of the present invention The 32×8 MUX comprises two groups 1310, 1320 of 4×1 multiplexers (MUXes) 1340. Each group comprises eight 4×1 MUXes 1340. The 32×8 MUX also has one group of eight 2×1 multiplexers 1380 and a single 8×1 MUX. 1365, connected to each of the MUXes 1340 of the second 4×1 MUXes group 1320.

Each 2×1 MUX 1380 is connected to the 8×1 MUX 1365 and to one of the multiplexers 1340 of the first group 1310.

In this preferred embodiment, the differential signals 1330 are inserted to the two groups 1310, 1320 of MUXes each having eight 4×1 MUXes 1340. The output signals 1350 of the first group 1310 serve as input signals 1350 to the group of eight 2×1 MUXes 1380. The output signals 1360 of the second group 1320 serve as input signals to an 8×1 MUX 1365. The 2×1 MUXes 1380 have two input signals 1350, 1370. The first input signal 1350 is the output of the first group 1310 of 4×1 MUXes 1340, the second input signal 1370 is the output signal of the 8×1 MUX 1365.

Since the 4×1 MUXes 1310-1320 are independently controlled, the output signals 1350 of the first group 1310 may be different from the output signals 1360 of the second group 1320. In this configuration the 2×1 MUXes 1380 select 8 out of 9 differential signals. Eight signals 1350 originate from the first group 1310 of 4×1 MUXes 1340, the ninth signal 1370 originates from the 8×1 MUX 1365. Preferably, the selected signals 1390 are input into the filters 1301, and digitized (not shown).

The MUX unit is designed to select the differential signals originating from the antennas in the tracking window. For example, the above 32×8 MUX may be utilized to implement a tracking window of 7 differential signals originating from the 64 antennas constructing the X axis of the sensor. By providing the possibility to select an independent $8^{th}$ antenna a digitizer can use the noise reduction algorithm described in U.S. patent application Ser. No. 11/063,535, by N-trig, entitled "Noise removal algorithm for digitizer systems".

The Analog-to-Digital Converter (A2D)

Digitizing the differential signals can be achieved by connecting an A2D component to each output of the 32×8 MUX. For example, a digitizer having 64 antennas on each axis requires a total of 16 A2D components, eight per axis.

Figure 14:
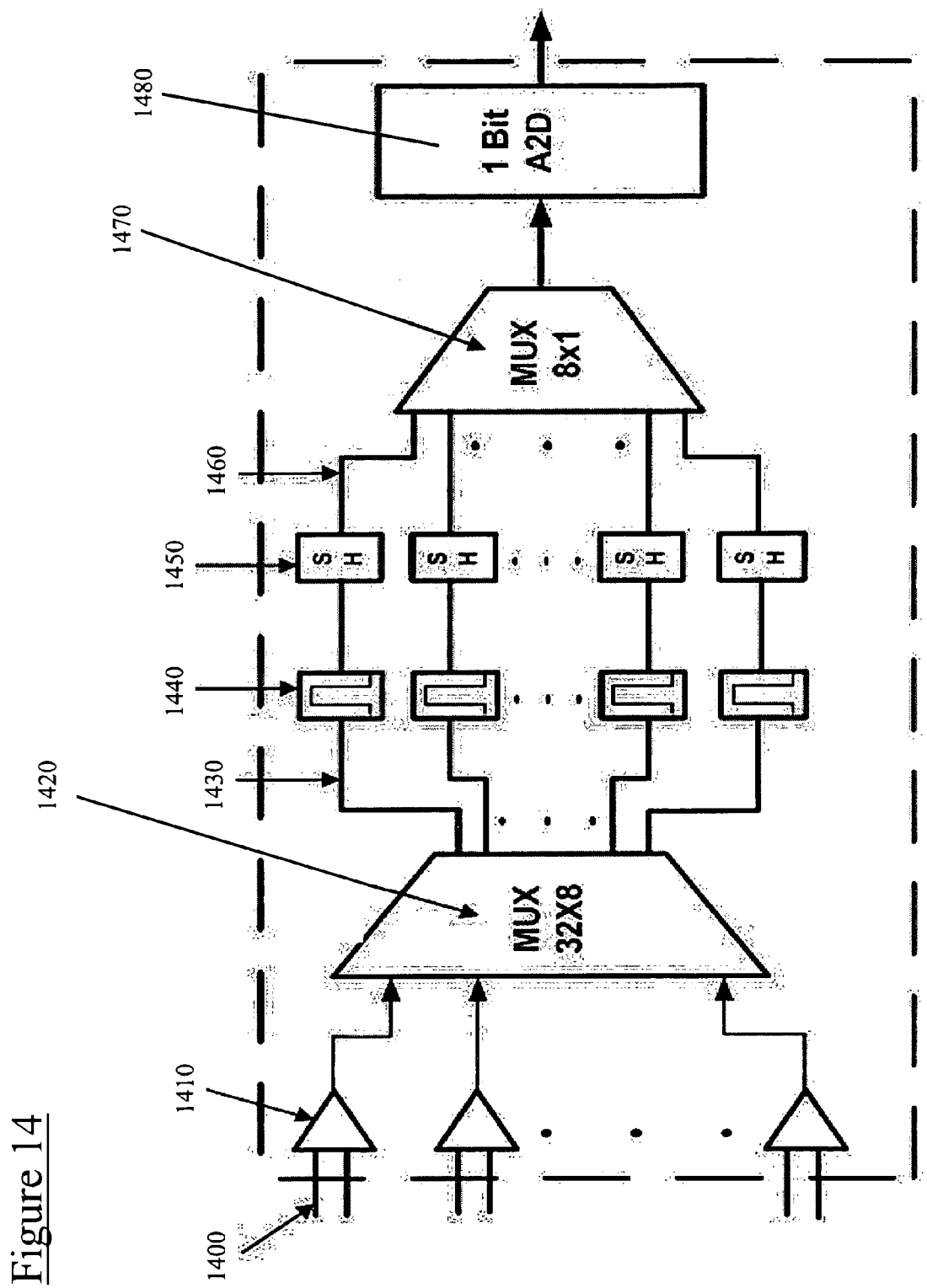
FIG. 14 is a block diagram of an analog-to digital converter (A2D) component implementation, according to a preferred embodiment of the present invention.

Reference is now made FIG. 14 which is a block diagram of an A2D component implementation, according to a preferred embodiment of the present invention.

A preferred embodiment of the present invention includes a set of differential amplifiers 1410, a 32×8 multiplexer (MUX) unit 1420, filters 1440, sample and hold components 1450, and a A2D 1480.

In a preferred embodiment, the received signals 1400 are amplified using a set of differential amplifiers 1410. A MUX unit 1420 selects the relevant signals participating in the tracking window. The tracking window consists of 8 differential signals 1430, selected from a total of 32 differential signals. The relevant signals are filtered by the filters 1440 and kept stable using eight sample and hold components 1450. The stable signals 1460 are forward to the A2D 1480 one at a time using an 8×1 MUX 1470.

The 8×1 MUX 1470 is designed to be fast enough to switch between its eight input signals 1460 before the next sample takes place. In order to assure that all the desired signals are digitized before the next sample, the operating frequency of the 8×1 MUX is at least 8 times higher then the sampling rate of the antennas. The A2D 1480 preferably finishes digitizing its input signal before the 8×1 MUX forwards the next signal to be digitized.

Since the scanning mode operates at a much lower update rate then the tracking mode, reducing the electronic components does not affect the scanning mode performance. In scanning mode, the antennas sampling rate may be reduced to enable processing of all the differential signals in the system. The processing may be implemented in several steps. For example, referring again to the system described in FIG. 10, the above system may process eight differential signals at a time. Processing 32 differential signals requires 4 steps, thus the update rate in the scanning mode is four times lower than with eight signals.

The present embodiments may also reduce the computational power required for determining the position of the physical object.

The digital signals originating from the front end units are processed by a digital unit, as described above. In a preferred embodiment of the present invention, the digital unit is a digital signal processing unit (DSP). However, other embodiments may implement the digital unit using a CPU, System on Chip (SOC) etc. The digital unit objective is to process the digital signals supplied by the A2D in the front end unit. The function of the digital unit is to determine the coordinates of the object position and forward them to the host computational device.

The present embodiments may enable calculating the object location using fewer instructions per second, thus reducing the computational power consumed by the DSP. One of the characteristics of a DSP unit is the number of instructions it can perform per second (Million Instructions Per Second, MIPS). The computational strength and power consumption of a DSP is determined by the number of instructions it can perform per second. The number of MIPS required for analyzing the received data is determined by the necessary update rate. High update rate requires faster processing, thus demanding a greater rate of MIPS. When selecting an appropriate DSP component one considers the minimal update rate that assures smooth and accurate detection of the physical object.

For example, a DSP unit that has to process signals from all 64 antennas, for a given update rate, may require X Million Instructions per Second. However, implementing a tracking window of 8 differential signals reduces the number of analyzed antennas. Thus the DSP processes only the differential signals originating from the tracking window. Therefore, the digitizer requires a DSP unit that performs only X/4 MIPS.

Consequently, the present embodiments may allow using relatively slow DSP units that save both money and power. Furthermore, when the DSP unit is faster then necessary, it becomes possible to shut it down between operations in order to save power.

Figure 15:
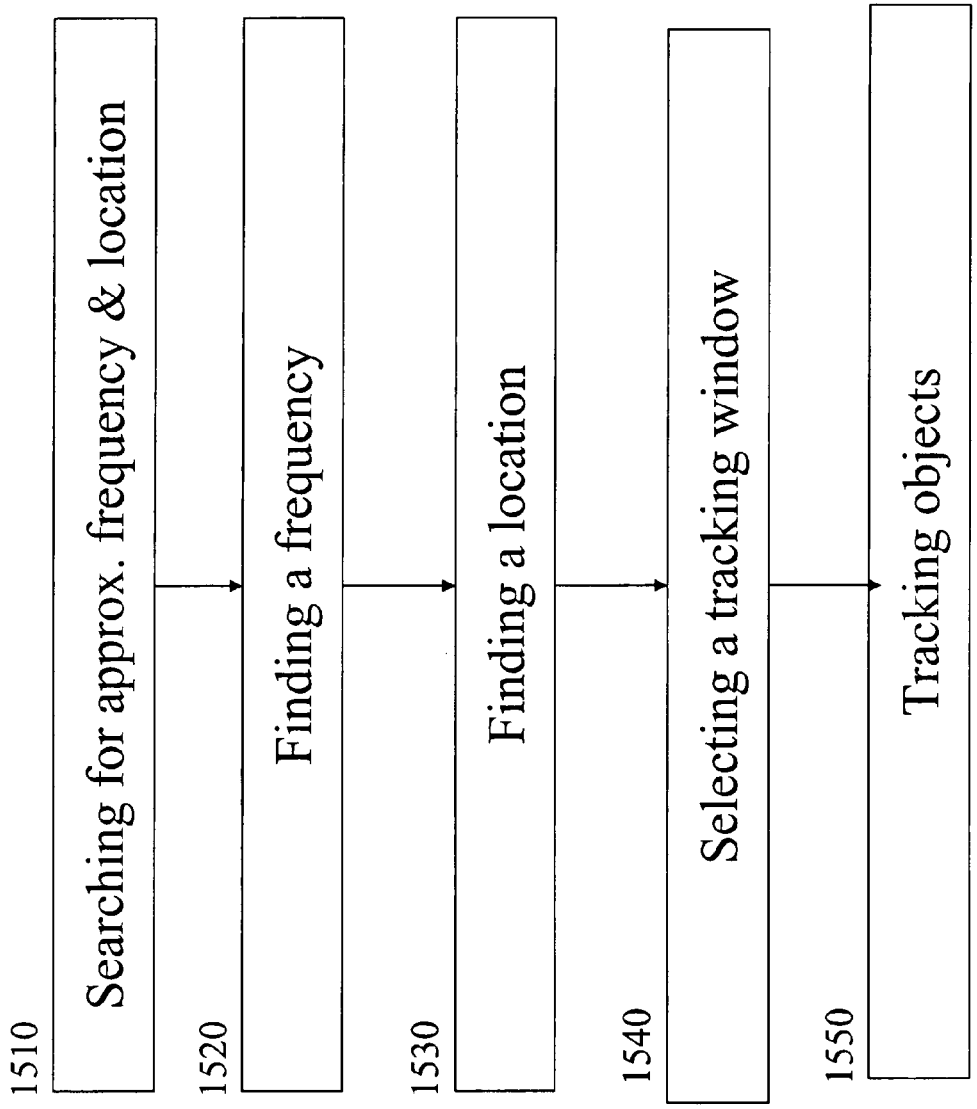
FIG. 15 is a flow diagram of a first exemplary method for detecting locations of physical objects according to a preferred embodiment of the present invention.

Reference is now made to FIG. 15 which is a flow diagram of a first exemplary method for detecting locations of physical objects according to a preferred embodiment of the present invention.

The first step involves searching for the approximate location and frequency of the physical object(s) 1510. At this stage either the detection frequency of the physical object or the location of the physical object are unknown. This stage typically involves applying wide frequency excitation pulse(s) on the whole sensing area, as described above, and illustrated in FIG. 4.

Once the approximate location and frequency of the physical object is determined, the precise frequency of the physical object is searched for 1520.

In a preferred embodiment, finding the precise frequency is performed by applying an excitation pulse in a narrow range of frequencies and sampling the sensing elements in the whereabouts of the approximate location of the object.

The frequency detection may be performed in two steps: first establishing a rough estimate while determining the location, and then pinpointing the precise frequency. In the second stage of scanning the approximate location is known, therefore, there is no point in sampling the entire sensing area.

After the precise frequency is found, the precise location of the physical object is also determined 1530, by applying the precise frequency on the subset of sensing elements. After finding the precise location of the physical object, a tracking window is selected 1540. The selected tracking window comprises a subset of the sensing elements which are spread across the sensing area.

In one embodiment, the tracking window may have a fixed size.

In a preferred embodiment of the present invention, the size of the tracking window is selected according to the speed of the physical object, the acceleration of the physical object, the direction of progress of the physical object, an analysis of recent historic data relating to the physical object, or any combination thereof.

In the last step, the physical object is tracked 1550, by applying the precise frequency and sampling the sensing elements included in the tracking window of the respective physical object. The precise location of the physical object is continuously kept track of, as long as the physical object frequency is kept the same, and the object position is sensed using the tracking window which moves with the physical object as it is maneuvered by the user in the sensing area.

Figure 16:
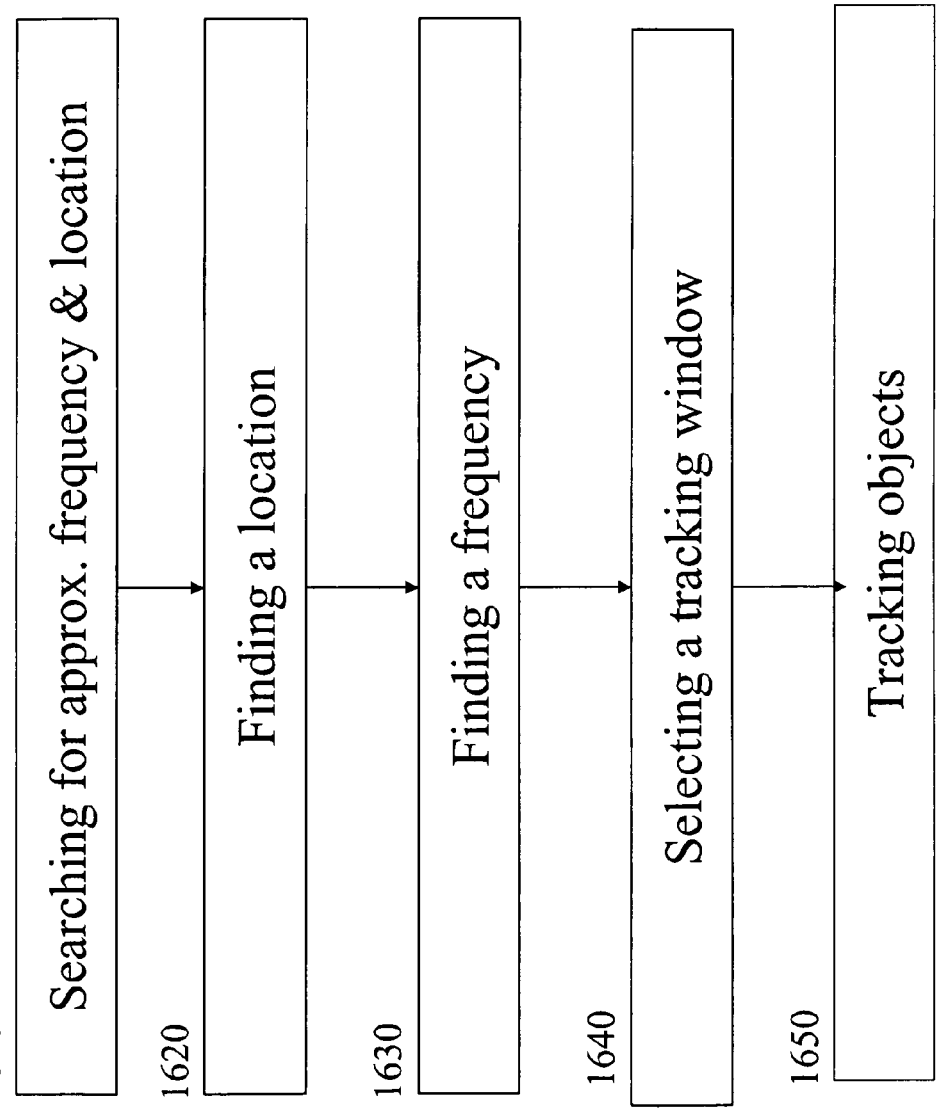
FIG. 16 is a flow diagram of a second exemplary method for detecting locations of physical objects according to a preferred embodiment of the present invention.

Reference is now made to FIG. 16 which is a flow diagram of a second exemplary method for detecting locations of physical objects according to a preferred embodiment of the present invention.

This second exemplary method is similar to the first exemplary method as described above and illustrated using FIG. 15, and involves the first step of searching 1610. However, in the second method, the precise location of the physical object is found 1620 prior to finding the precise frequency of the physical object 1630. As with the first method, a tracking window is selected for each respective physical object 1640, and the physical object precise location is continuously kept track of 1650, until the physical object is removed from the sensing area or changes its frequency.

In another preferred embodiment of the present invention, finding the precise location of the physical object and finding the precise frequency of the physical object may be carried out simultaneously.

It is expected that during the life of this patent many relevant devices and systems will be developed and the scope of the terms herein, particularly of the terms "digitizer", "computer", "stylus", "screen", "filter", "MUX", "bus", "A2D", "digital unit", "antenna", and "sensor", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for determining position of user interactions on a surface comprising:
 a plurality of sensing elements to sense a position of an user interaction, each sensing element associated with a position on the surface; and
 a controller configured to receive signals from at least some of the plurality of sensing elements, to dynamically select a tracking window associated with a subset of the sensing elements, wherein the tracking window is selected responsive to one or more of speed, direction of progress, and/or acceleration of the user interaction and to determine a position of the user interaction utilizing only signals received from the subset of sensing elements selected.

2. The apparatus of claim 1, wherein said user interactions are sensed via an object.

3. The apparatus of claim 2, wherein said controller has a tracking mode, defined to trigger selection of said tracking window and dynamic updating of said tracking window, to keep track of said object.

4. The apparatus of claim 3, wherein said tracking mode triggers using a narrow range of frequencies, for detecting the respective object.

5. The apparatus of claim 2, wherein said controller has a search mode, defined to trigger using a wide range of frequencies and all the sensing elements for searching for an approximate location and an approximate frequency of the respective object.

6. The apparatus of claim 5, wherein said search mode is defined to sample the whole sensing area.

7. The apparatus of claim 5, wherein the controller is configured to switch to said search mode, when said object changes its frequency.

8. The apparatus of claim 1, wherein at least one of said user interactions is an electromagnetic stylus.

9. The apparatus of claim 1, wherein at least one of said user interactions is a touch.

10. The apparatus of claim 1, wherein said user interactions are sensed via a plurality of objects.

11. The apparatus of claim 10, wherein the sensing elements are configured to sense a plurality of physical objects.

12. The apparatus of claim 11, wherein the sensing elements are configured to use respective detection frequencies of said physical objects, for detecting a respective physical object.

13. The apparatus of claim 1, wherein the tracking window has a fixed size.

14. The apparatus of claim 1, wherein the tracking window comprises a predetermined number of sensing elements.

15. The apparatus of claim 1, wherein the tracking window has a dynamically adjusted size.

16. The apparatus of claim 1, further comprising a multiplexer (MUX), associated with said sensing elements and with said controller, and configured for inputting signals from said tracking window and excluding signals not from said tracking window.

17. The apparatus of claim 1 comprising a grid of conductive lines wherein the sensing elements are the conductive lines.

18. The apparatus of claim 17 wherein the sensing elements provide signals responsive to the presence of the user interaction near one or more of the conductive lines of the grid.

19. The apparatus of claim 17 wherein the sensing elements provide signals responsive to the presence of the user interaction over one or more of the conductive lines of the grid.

20. The apparatus of claim 1 wherein the tracking window is additionally selected responsive to a position of the user interaction.

21. The apparatus of claim 1 wherein the tracking window is selected by software.

22. The apparatus of claim 1 wherein the tracking window is selected by hardware.

23. A method for determining position of user interactions on a surface, the method comprising:
receiving signals from at least some of a plurality of sensing elements, each sensing element associated with a position on the surface;
detecting the presence of an user interaction responsive to the signals received;
selecting a subset of sensing elements from which signals are to be acquired, wherein the subset of sensing elements is responsive to one or more of speed, direction of progress, and/or acceleration of the user interaction; and
determining a subsequent position of the user interaction utilizing signals only from the subset of sensing elements selected.

24. The method of claim 23 comprising:
determining a detection frequency of the user interaction, and
selecting the subset of sensing elements response to signals received in the detection frequency.

25. The method of claim 23 wherein the sensing elements are a plurality of conductive lines arranged in a grid.

26. The method of claim 23 wherein the selecting of the subset of sensing elements is responsive to at least a position of the user interaction.

27. The method of claim 23 wherein the selecting of the subset of sensing elements is by software.

28. The method of claim 23 wherein the selecting of the subset of sensing elements is by hardware.

29. Apparatus for determining position of user interactions on a surface comprising:
a plurality of sensing elements operative to sense a position of a user interaction over time, each sensing element associated with a position on the surface; and
a controller configured to select a subset of sensing elements corresponding to an area substantially centered around a previous position of the user interaction, and to determine a current position of the user interaction utilizing only signals received from the subset of sensing elements selected.

30. The apparatus of claim 29 comprising a grid of conductive lines wherein the plurality of sensing elements is the conductive lines.

31. The apparatus of claim 29, wherein the subset of sensing elements is additionally selected responsive to one or more of speed, direction of progress, and/or acceleration of the user interaction, 32. The apparatus of claim 29, wherein the subset of sensing elements comprises a predetermined number of sensing elements.

33. The apparatus of claim 29, wherein the subset of sensing elements comprises an adjustable number of sensing elements.

34. The apparatus of claim 29, wherein the subset of sensing elements is selected by hardware.

35. The apparatus of claim 29, wherein the subset of sensing elements is selected by software.

36. The apparatus of claim 29, wherein the user interactions is selected from a group including: physical object, electromagnetic stylus and touch.

37. Apparatus for determining position of user interactions on a surface comprising:
a plurality of sensing elements operative to sense a position of a user interaction over time, each sensing element associated with a position on the surface; and
a controller configured to select a subset of sensing elements corresponding to a single area surrounding a previous position of the user interaction, and to determine a current position of the user interaction utilizing only signals received from the subset of sensing elements selected.

38. The apparatus of claim 37 comprising a grid of conductive lines wherein the plurality of sensing elements is the conductive lines.

39. The apparatus of claim 37, wherein the subset of sensing elements is additionally selected responsive to one or more of speed, direction of progress, and/or acceleration of the user interaction.

40. The apparatus of claim 37, wherein the subset of sensing elements comprises a predetermined number of sensing elements.

41. The apparatus of claim 37, wherein the subset of sensing elements comprises an adjustable number of sensing elements.

42. The apparatus of claim 37, wherein the subset of sensing elements is selected by hardware.

43. The apparatus of claim 37, wherein the subset of sensing elements is selected by software.

44. The apparatus of claim 37, wherein the user interactions is selected from a group including: physical object, electromagnetic stylus and touch.

45. A method for determining position of user interactions on a surface, the method comprising:
- sampling signals from at least some of a plurality of sensing elements, each sensing element associated with a position on the surface;
- selecting a subset of the plurality of sensing elements based on information in the signals sampled, wherein the selecting is performed dynamically;
- sampling subsequent signals only from the subset of the sensing elements; and
- determining a position of the user interaction utilizing only signals received from the subset of sensing elements selected.

46. The method of claim 45, wherein the plurality of sensing elements is a grid of conductive lines.

47. The method of claim 45, wherein the selecting of the subset of sensing elements is additionally responsive to one or more of speed, direction of progress, and/or acceleration of the user interaction.

48. The method of claim 45, wherein the subset of sensing elements comprises a predetermined number of sensing elements.

49. The method of claim 45, wherein the subset of sensing elements is selected by hardware.

50. The method of claim 45, comprising searching for an approximate location and an approximate frequency of the user interaction on at least some of the plurality of sensing elements.

51. The method of claim 45, wherein the subset of sensing elements is selected by software.

52. Apparatus for determining position of user interactions on a surface comprising:
- a plurality of sensing elements operative to sense a position of a user interaction, each sensing element associated with a position on the surface; and
- a controller configured to dynamically select a subset of the sensing elements, to sample signals only from the subset of the sensing elements, and to determine a position of the user interaction utilizing only signals received from the subset of sensing elements selected.

53. The apparatus of claim 52 comprising a grid of conductive lines wherein the plurality of sensing elements is the grid of conductive lines.

54. The apparatus of claim 52, wherein the subset of sensing elements is additionally selected responsive to one or more of speed, direction of progress, and/or acceleration of the user interaction.

55. The apparatus of claim 52, wherein the subset of sensing elements comprises a predetermined number of sensing elements.

56. The apparatus of claim 52, wherein the subset of sensing elements comprises an adjustable number of sensing elements.

57. The apparatus of claim 52, wherein the subset of sensing elements is selected by hardware.

58. The apparatus of claim 52, wherein the subset of sensing elements is selected by software.

59. The apparatus of claim 52, wherein said user interactions is selected from a group including: physical object, electromagnetic stylus and touch.

\* \* \* \* \*